United States Patent
Ozawa

(10) Patent No.: US 8,819,551 B2
(45) Date of Patent: Aug. 26, 2014

(54) DISPLAY DEVICE AND METHOD, AND PROGRAM

(75) Inventor: Takeshi Ozawa, Chiba (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 12/069,544

(22) Filed: Feb. 11, 2008

(65) Prior Publication Data

US 2008/0196080 A1    Aug. 14, 2008

(30) Foreign Application Priority Data

Feb. 13, 2007    (JP) .................................. 2007-032489

(51) Int. Cl.
*H04N 7/173*        (2011.01)
(52) U.S. Cl.
USPC ......................................................... 715/712
(58) Field of Classification Search
USPC .................................. 715/712, 727, 838, 153
See application file for complete search history.

(56) References Cited

U.S. PATENT DOCUMENTS

| | | | |
|---|---|---|---|
| 6,690,403 B1* | 2/2004 | Tuli .............................. | 715/854 |
| 2002/0038299 A1* | 3/2002 | Zernik et al. ..................... | 707/3 |
| 2002/0054164 A1* | 5/2002 | Uemura ........................ | 345/848 |
| 2005/0259949 A1* | 11/2005 | Habuta et al. .................. | 386/46 |
| 2006/0056796 A1* | 3/2006 | Nishizawa et al. ............... | 386/3 |

FOREIGN PATENT DOCUMENTS

| | | |
|---|---|---|
| JP | 2006-018794 A | 1/2006 |
| JP | 2006-268010 A | 10/2006 |
| JP | 2006-311573 A | 11/2006 |

* cited by examiner

*Primary Examiner* — Peiyong Weng
(74) *Attorney, Agent, or Firm* — Wolf, Greenfield & Sacks, P.C.

(57) ABSTRACT

A display device includes: a storage portion storing content addition information associated with one or two or more pieces of content data; a display screen generation portion generating a display screen, which includes image information related with one content addition information stored in the storage portion; and a display switch portion outputting a switch instruction of the image information included on the display screen, and the display screen generation portion switches the image information included on the display screen to other image information related with the one content addition information according to output of the switch instruction by the display switch portion.

16 Claims, 19 Drawing Sheets

FIG.8

| OBJECT ID | NODE NAME | MASTER ID | SLAVE ID |
|---|---|---|---|
| 410 | ALL MUSICAL PIECES | 404 | 418, 420, 422, · |
| 412 | ALBUM | 404 | 424, 426, 428, · |
| 414 | ARTIST | 404 | 430, 432, 434, · |
| 416 | PLAYLIST | 404 | 436, 438, 440, · |

FIG.9

| OBJECT ID | ALBUM NAME | MASTER ID | SLAVE ID | JACKET PHOTOGRAPH URI |
|---|---|---|---|---|
| 424 | FIVE DIMENSIONS | 412 | 442, 444, 446, ...... | aaa |
| 426 | MCUB | 412 | 470, 472, ...... | bbb |
| 428 | SKY | 412 | 474, 476, ...... | ccc |
| 454 | HIGH HEART | 430 | 478, 480, ...... | ddd |
| 448 | ALL ALBUMS | 448 | 462, 464, 466, ...... | aaa,ccc,ddd,... |
| ... | ... | ... | ... | ... |

FIG.10

| OBJECT ID | NAME OF MUSICAL PIECE | MASTER ID | ALBUM NAME | ARTIST NAME | URI OF MUSICAL PIECE FILE |
|---|---|---|---|---|---|
| 442 | WORLD PERIOD | 424 | FIVE DIMENSIONS | MISTERS | sn1n |
| 444 | BYGONE DAYS | 424 | FIVE DIMENSIONS | MISTERS | sn2n |
| 446 | CROSS LINE | 424 | FIVE DIMENSIONS | MISTERS | sn3n |
| 456 | FLYING HORSE RIDER | 436 | MCUB | PORNOTRIP | sn4n |
| ... | ... | ... | ... | ... | ... |

FIG.11
| ALBUM NAME | JACKET PHOTOGRAPH |
|---|---|
| FIVE DIMENSIONS | 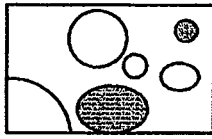 504 |
| SKY | 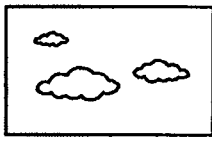 508 |
| HIGH HEART | 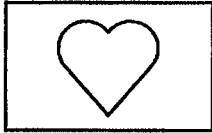 512 |
| MCUB |  516 |

FIG.12
| NAME OF MUSICAL PIECE | JACKET PHOTOGRAPH |
|---|---|
| WORLD PERIOD |  520 |
| BYGONE DAYS | 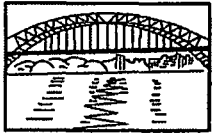 524 |
| CROSS LINE | 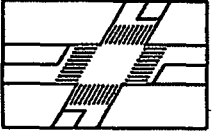 528   532 |
| PROOF |  536 |
| FLYING HORSE RIDER | 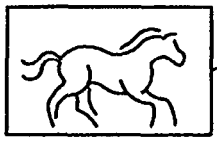 540 |

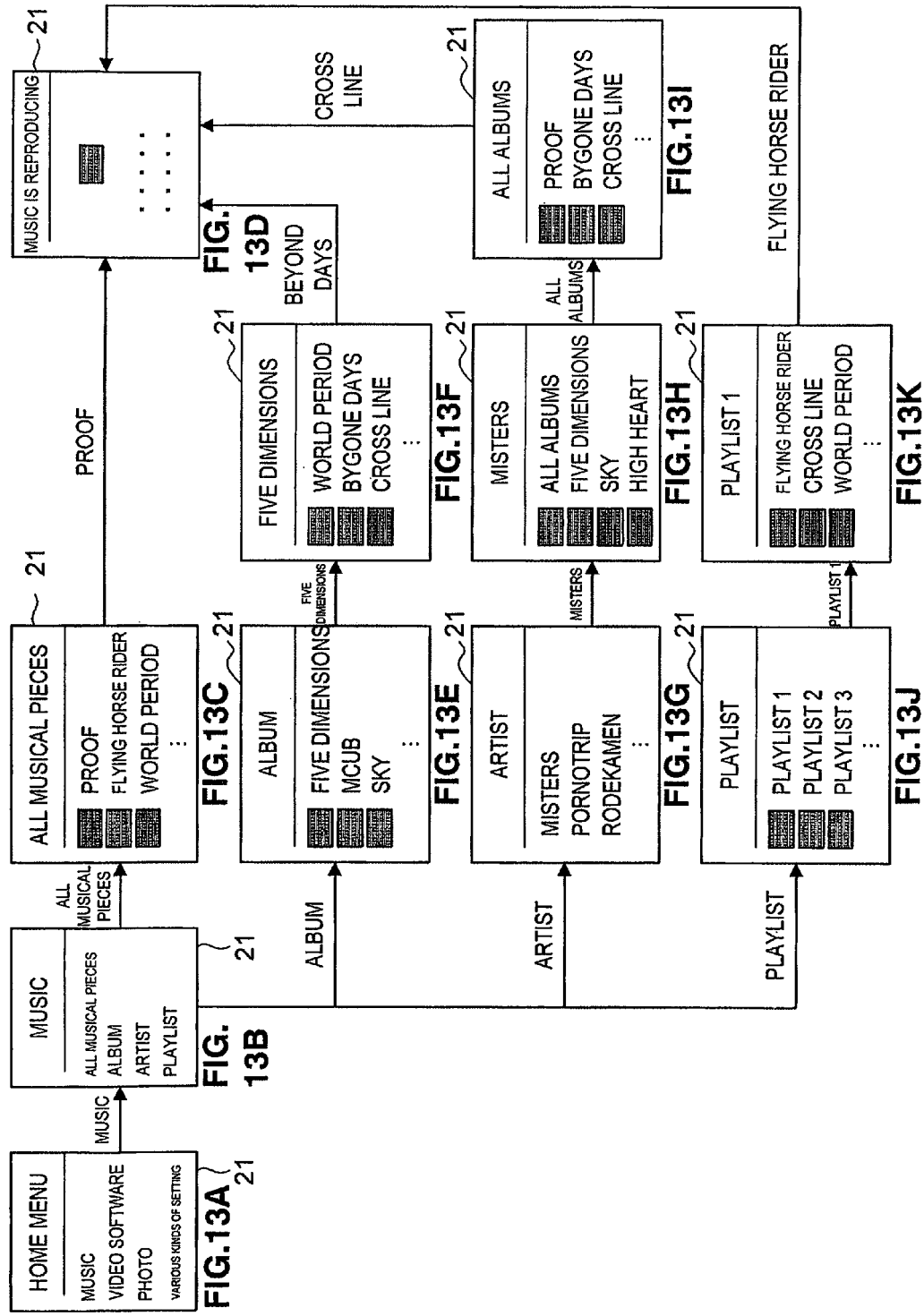

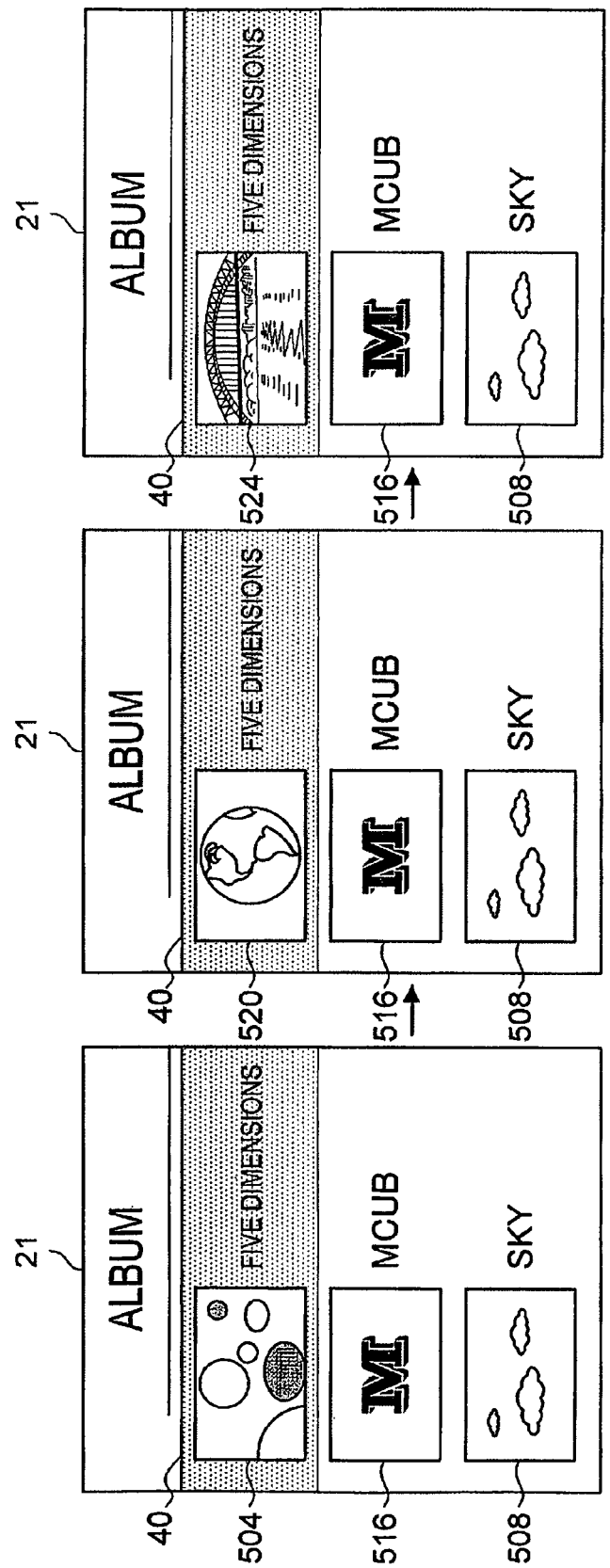

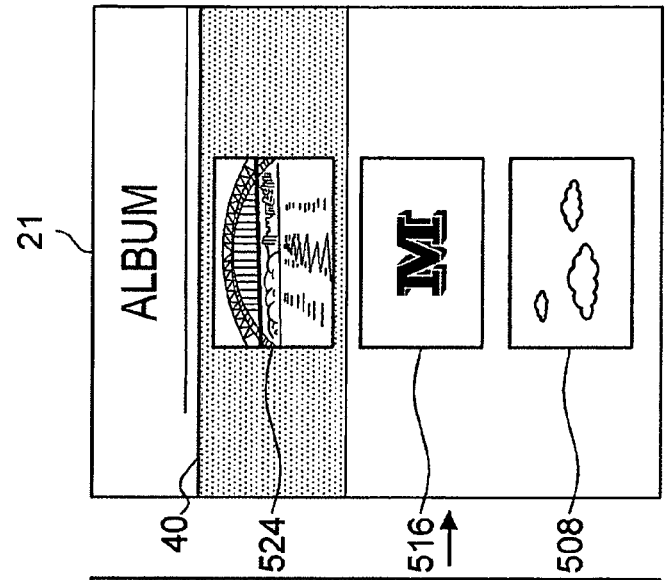
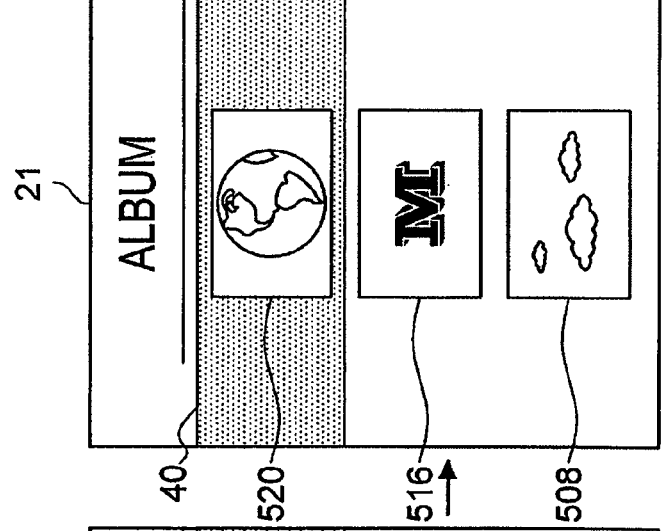
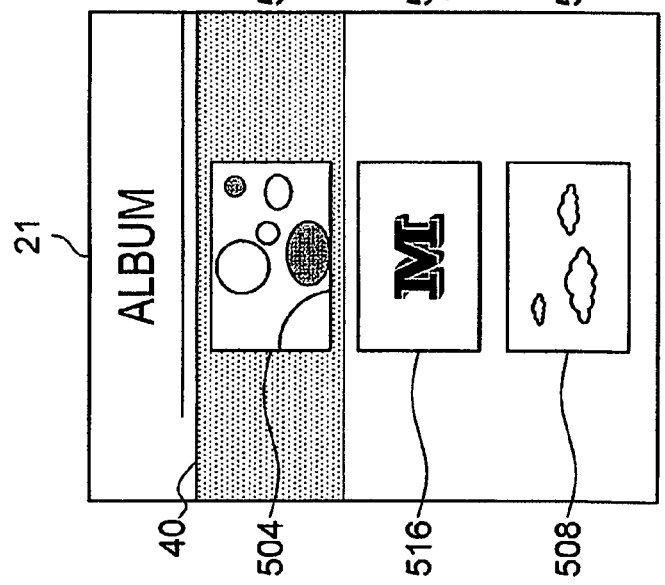

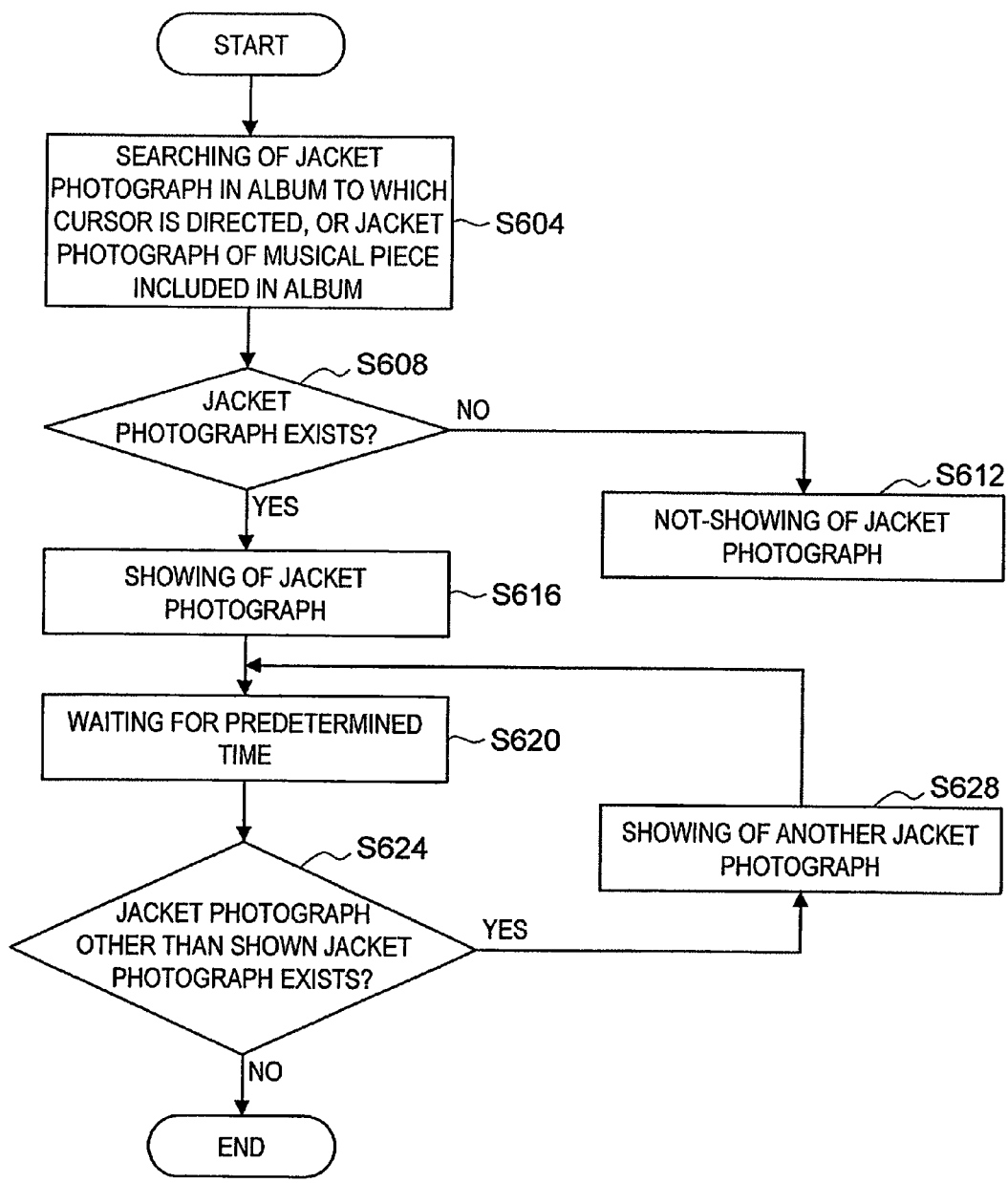

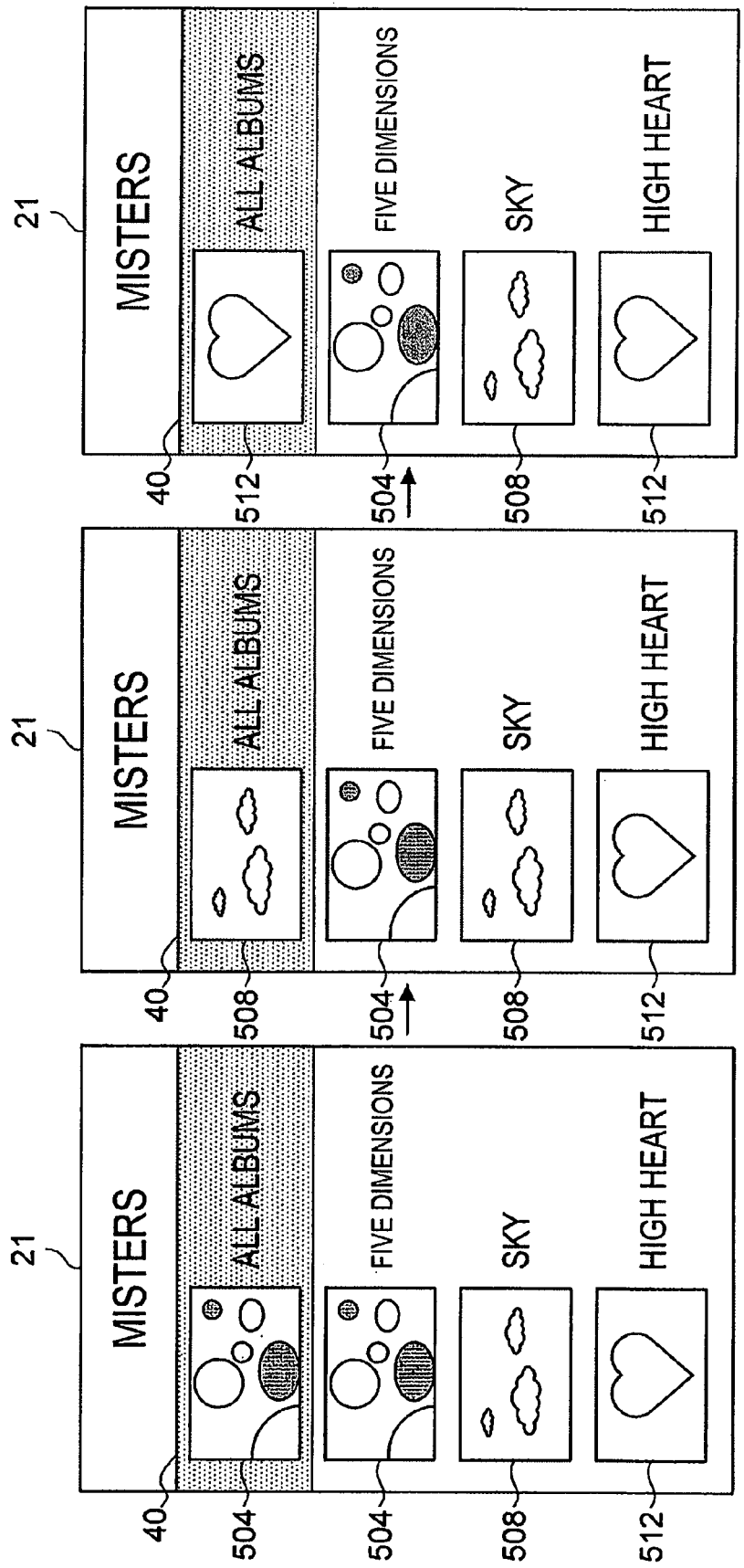

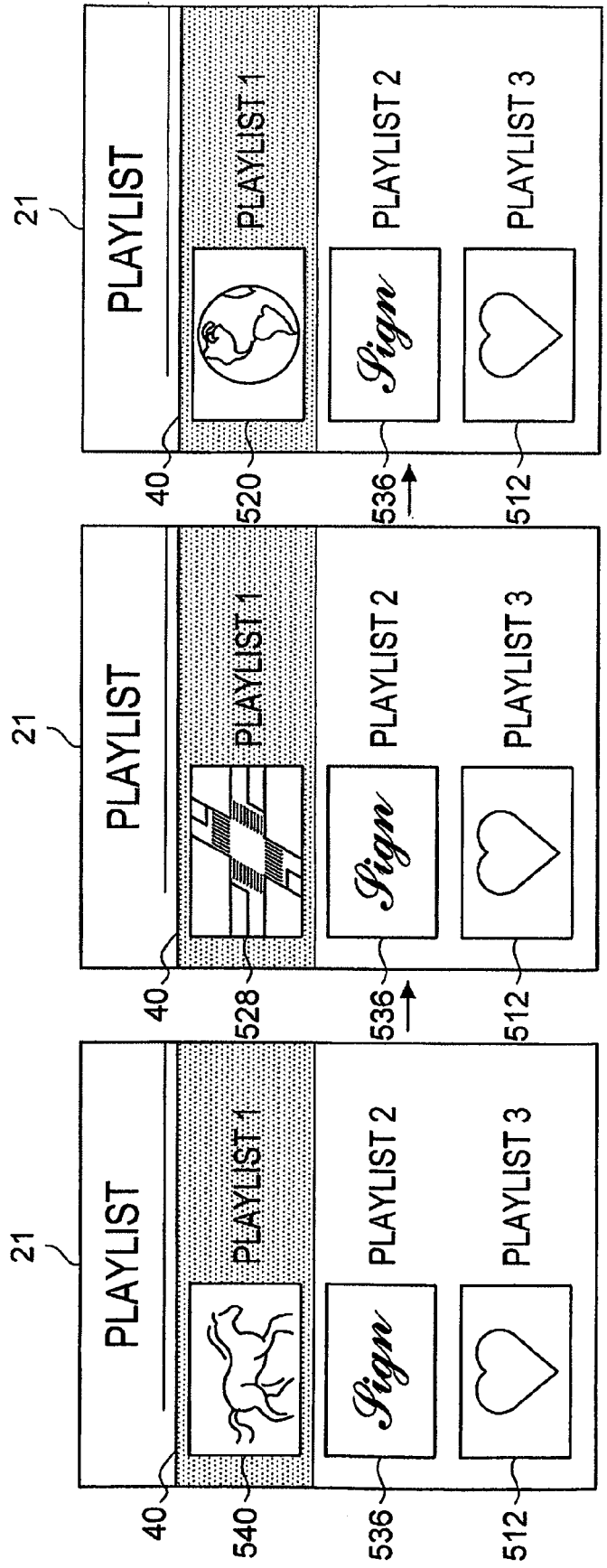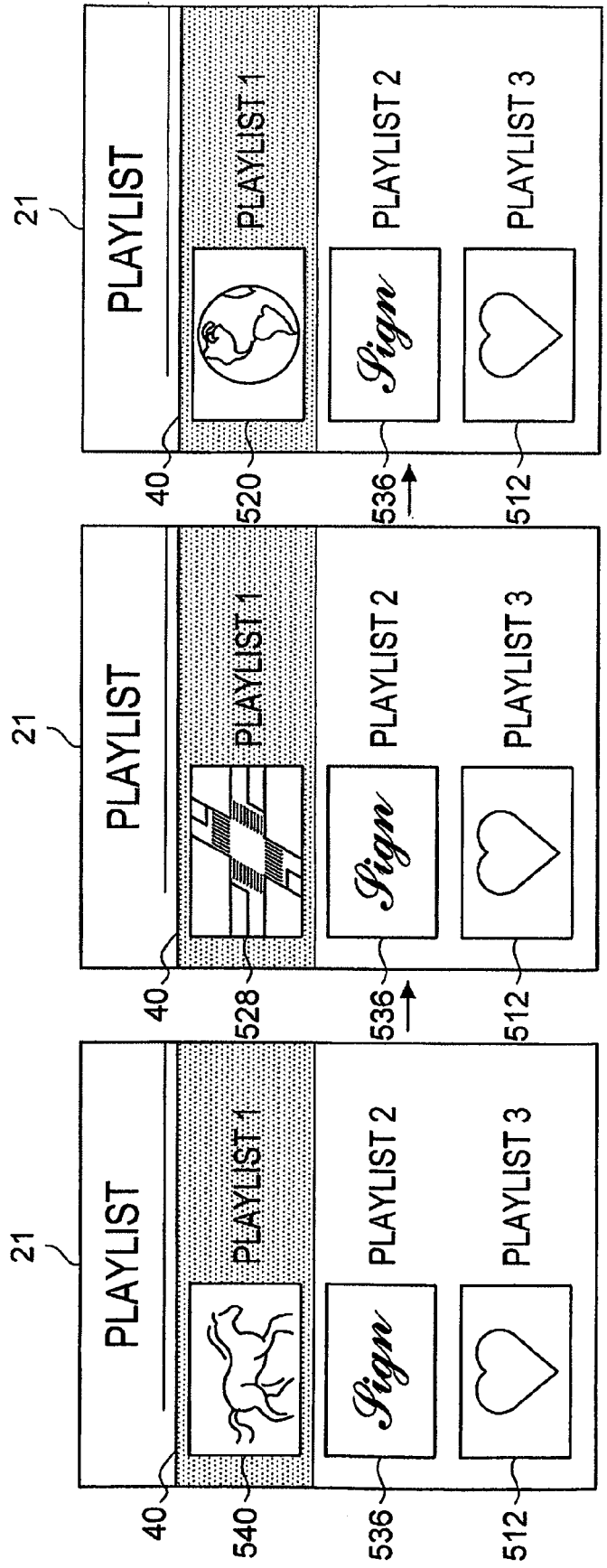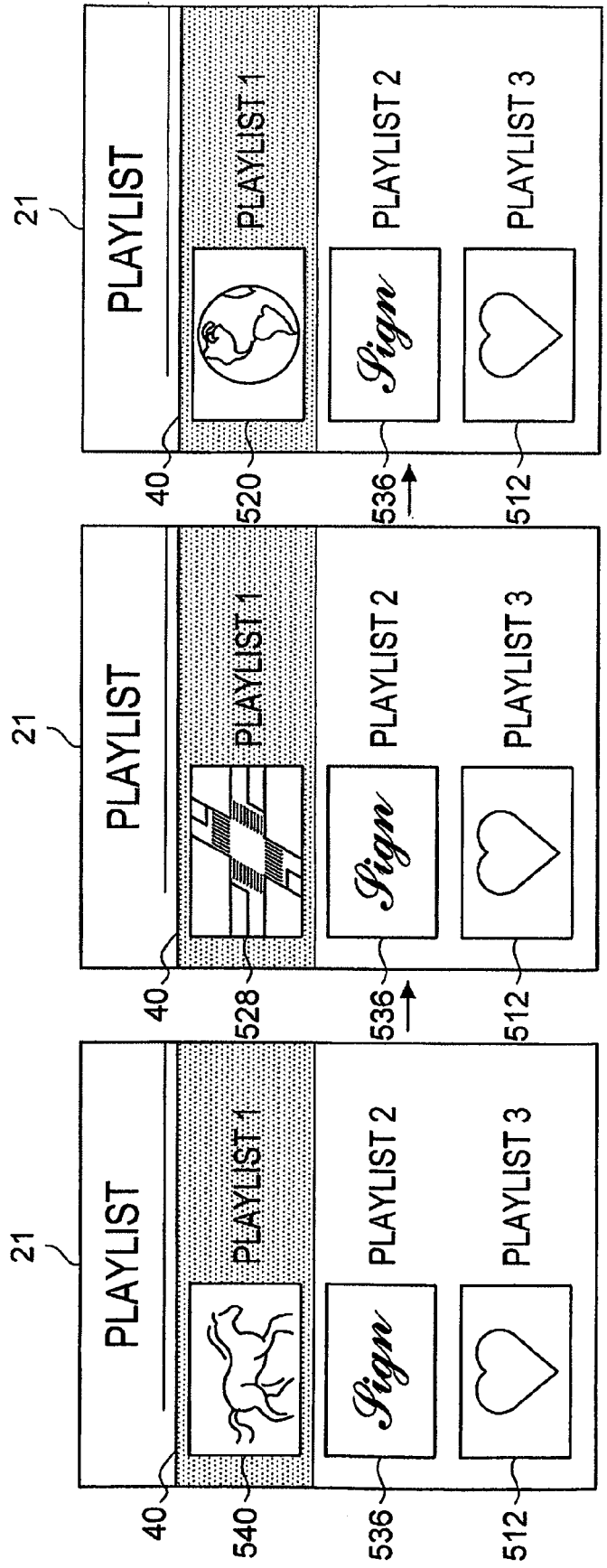

DISPLAY DEVICE AND METHOD, AND PROGRAM

CROSS REFERENCES TO RELATED APPLICATIONS

The present application contains subject matter related to and claims priority to Japanese Patent Application JP 2007-032489 filed in the Japan Patent Office on Feb. 13, 2007, the entire contents of which is incorporated herein by reference.

BACKGROUND OF THE INVENTION

1. Field of the Invention

The present invention relates to a device and a method for display, and programs.

2. Description of the Related Art

Recently, there has been widely used portable equipment which may reproduce content data such as images and voices. The above portable equipment stores content data and a search database through which a user searches content data. For example, a node corresponding to an artist name of content data, a node corresponding to an album name of content data, and a node corresponding to a title of content data are hierarchically stored in the search database. In the portable equipment, text information such as an artist name and an album name, which are corresponding to one of the above nodes is displayed when a user searches content data. The user may search the content data by selecting a desired artist name, or an album name among the displayed ones, and by following the hierarchical structure.

Japanese Patent Application Laid-Open No. 2006-018794 has disclosed a display method in which, when content data is searched, jacket photographs, instead of the album name and the title of the above-described content data, of an album and content data are displayed. When content data is searched, it is effective to display a jacket photograph as described in the present display method, because the jacket photograph may remember the content of an album, or content data, which is corresponding to the jacket photograph, to a user.

SUMMARY OF THE INVENTION

However, there are plural pieces of image information on a jacket photograph and the like related with each content data and each album in some cases. Accordingly, there has been a case in which a user may not fully understand the content of content data, or an album, and feels inconvenience when the user searches the content data according to a related display method in which only one image information is displayed for one content data, or one album.

Then, the present invention has been made, considering the above-described issue, and it is desirable to provide a new and improved display device and method, and a program, by which a user may more conveniently search content data.

According to an embodiment of the present invention, there is provided a display device, including: a storage portion storing content addition information associated with one, or two or more pieces of content data; a display screen generation portion generating a display screen, which includes image information related with one content addition information stored in the storage portion; and a display switch portion outputting a switch instruction of the image information included on the display screen, wherein the display screen generation portion switches the image information included on the display screen to other image information related with the one content addition information according to output of the switch instruction by the display switch portion.

Here, the content addition information is hierarchized according to the attribute of associated content data and is stored in the storage portion, and image information related with the one content addition information acceptably includes: image information included in the one content addition information; or image information included in content addition information in the lower hierarchy of the one content addition information.

In the above configuration, the storage portion stores a database in which content addition information is arranged in the lower hierarchy of content addition information indicating a set of two or more pieces of content data, and including an album name, an artist name, and the like, wherein the content addition information includes the name of content data recorded in the album, and the name of content data made by the artist.

Moreover, the display screen generation portion generates a display screen including image information related with one content addition information. Here, the image information related with one content addition information acceptably is image information included in the content addition information when one content addition information is a content addition information in the lowest hierarchy. Moreover, image information related with one content addition information acceptably is at least any one of image information included in one content addition information, or image information included in a content addition information in the lower hierarchy when one content addition information has content addition information in the lower hierarchy. Moreover, the display screen generation portion switches the image information included on the display screen to other image information related with the one content addition information according to output of the switch instruction by the display switch portion.

As described above, the display device according to an embodiment of the present invention may sequentially switch image information related with the content addition information on the display screen as an image information of a certain content addition information. Thereby, a user of the display device may remember the content of the content addition information based on image information pieces of which are sequentially switched. Thereby, a user may more conveniently search content data according to the above display device.

Moreover, the display switch portion may output a switch instruction at predetermined intervals. In the above configuration, the display screen generation portion may sequentially switch image information related with one content addition information included on the display screen to other image information related with one content addition information at a predetermined intervals. Accordingly, a user may understand the content of the content addition information based on image information automatically switched one by one as image information on content addition information.

Moreover, the display switch portion may output a switch instruction at intervals corresponding to the number of pieces of image information related with one content addition information. For example, the display switch portion may shorten output intervals of the switch instruction when there are large number of pieces of image information related with one content addition information, and it is acceptable to lengthen the output intervals of the switch instruction when the number of pieces of image information related with one content addition information is large. Alternatively, the display switch portion may output a switch instruction at time intervals obtained by dividing set time by the number of pieces of image information related with one content addition information.

In the above configuration, time for displaying all pieces of image information related with each content addition information may be smoothed even when the number of pieces of image information related with content addition information depends on pieces of the content addition information. Accordingly, even when the number of pieces of image information related with one content addition information is larger than that of pieces of image information related with other pieces of content addition information, time for displaying all pieces of image information related with one content addition information may be shortened by shortening intervals for switching pieces of image information related with one content addition information. Alternatively, the display switch portion may sequentially display all pieces of image information related with content addition information in specific time, regardless of the number of pieces of image information related with content addition information.

Moreover, the display switch portion may output a switch instruction based on operation of a user. For example, the display switch portion may output a switch instruction every time a user operation is input. Alternatively, there may be another configuration in which the display switch portion outputs a switch instruction at predetermined intervals while user operation is not detected, and, while user operation is detected, output of a switch instruction is stopped. In the above configuration, the display screen generation portion may switch image information related with one content addition information included on the display screen to other image information related with one content addition information when a switch instruction based on operation of a user is output from the display switch portion. Accordingly, a user may maintain display of a certain image information, or may switch display of a certain image information to that of another image information related with the same content addition information.

Moreover, there may be another configuration in which the display screen generation portion generates a display screen including image information related with a plurality of pieces of content addition information, and switches only image information of content addition information, on which a cursor is put among a plurality of pieces of image information, according to output of a switch instruction by the display switch portion. Here, even when a plurality of image information included on the display screen are sequentially switched, it is difficult for a user to understand all pieces of image information to be switched. Moreover, when all the plurality of pieces of image information included on the display screen are sequentially switched, there are some cases in which some of users feel complex. Then, there may be another configuration, as described above, in which the display screen generation portion switches only image information of content addition information, on which the cursor is put, among a plurality of pieces of image information included on the display screen according to output of a switch instruction by the display switch portion. Thereby, a process load for switching of image information is reduced, and, at the same time, use feeling of a user may be improved.

Moreover, there may be another configuration in which a reproduction portion reproducing content data including voice information is further included, and the reproduction portion may reproduce voice information in content data corresponding to image information included on a display screen generated by the display screen generation portion. For example, when a jacket photograph of one content data included in an album is included on the display screen generated by the display screen generation portion as an image information related with content addition information including one album name, the reproduction portion may reproduce the voice of the content data. Moreover, image information included on the display screen is switched according to a switch instruction by the display switch portion, and, then, even content data reproduced by the reproduction portion is switched according to a switch instruction by the display switch portion.

In the above configuration, the display screen generation portion generates a display screen including image information representing one content data corresponding to content addition information as image information related with content addition information, and, at the same time, the reproduction portion reproduces the one content data. Accordingly, a user may understand the content of the above-described content addition information based on image information representing one content data to be displayed, and voices of the one content data to be reproduced. Thereby, a user may search content data in a further convenient manner according to the above display device.

Moreover, when a reproduction instruction for one content addition information is input, the reproduction portion may start reproduction of content data corresponding to image information generated as image information related with one content addition information at input of a reproduction instruction. In the above configuration, for example, when a user desires reproduction of content data indicated by image information included on the display screen, reproduction of the above content data may be immediately started without following the hierarchical structure of pieces of content addition information.

According to another embodiment of the present invention, there is provided a program by which a computer functions as a display device, wherein the display device includes: a recording portion recording content addition information associated with one, or two or more pieces of content data in a storage medium; a display screen generation portion generating a display screen, which includes image information related with one content addition information recorded in the storage medium; and a display switch portion outputting a switch instruction of the image information included on the display screen, and the display screen generation portion switches the image information included on the display screen to other image information related with the one content addition information according to output of the switch instruction by the display switch portion.

According to the above program, a hardware configuration of computers such as a CPU, a ROM, a RAM, and the like may realize functions of the recording portion, the display screen generation portion, and the display switch portion, which have been explained above. That is, a computer using the above program may function as the above-described display device.

The content addition information is hierarchized according to the attribute of the associated content data, and recorded in a storage medium, wherein image information related with one content addition information may include image information included in one content addition information, or image information included in content addition information in the lower hierarchy of one content addition information.

There may be a configuration in which there is further included a reproduction portion reproducing content data including voice information, and the reproduction portion may reproduce voice information on the content data corresponding to the image information included on the display screen generated by the display screen generation portion.

When a reproduction instruction for one content addition information is input, the reproduction portion may start reproduction of content data corresponding to image information generated as image information related with one content addition information when the reproduction instruction is input.

According to another embodiment of the present invention, there is provided a display method including steps of: recording content addition information associated with one, or two or more pieces of content data in a storage medium; generating a display screen, which includes image information related with one content addition information stored in the storage medium; outputting a switch instruction of the image information included on the display screen, and switching the image information included on the display screen to other image information related with the one content addition information.

According to the above display method, image information related with content addition information on the display screen may be sequentially switched as an image information of content addition information. Accordingly, a user of the display device executing the above display method may recollect the content of content addition information based on the image information switched in a sequential manner. Thereby, a user may more conveniently search content data according to the above display method.

According to the embodiments of the present invention described above, a user may more conveniently search content data.

BRIEF DESCRIPTION OF THE DRAWINGS

FIG. 8 is an explanatory view showing one example of metadata arranged at a node in the third hierarchy of the search database;

FIG. 9 is an explanatory view showing one example of metadata of an album arranged at a node in the search database;

FIG. 10 is an explanatory view showing one example of metadata of content data arranged at a node in the search database;

FIG. 11 is an explanatory view showing examples of jacket photographs for each of albums;

FIG. 12 is an explanatory view showing examples of jacket photographs of pieces of content data;

FIG. 13 is an explanatory view showing a search screen generated by the display screen generation portion;

FIG. 14A through FIG. 14C are explanatory views showing one example of each search screen represented by the display portion in the portable equipment;

FIG. 15A through FIG. 15C are explanatory views showing a modification example of each search screen displayed by the display portion;

FIG. 16 is a flow chart showing a flow of a display method in the portable equipment 0 displaying a search screen shown in FIG. 14A through FIG. 14C in a display portion;

FIG. 17A through FIG. 17C are explanatory views showing other examples of search screens displayed by a display portion of a portable equipment;

FIG. 19A through FIG. 19C are explanatory views showing another example of each search screen displayed by a display portion in a portable equipment.

DETAILED DESCRIPTION OF THE PREFERRED EMBODIMENTS

Figure 1:
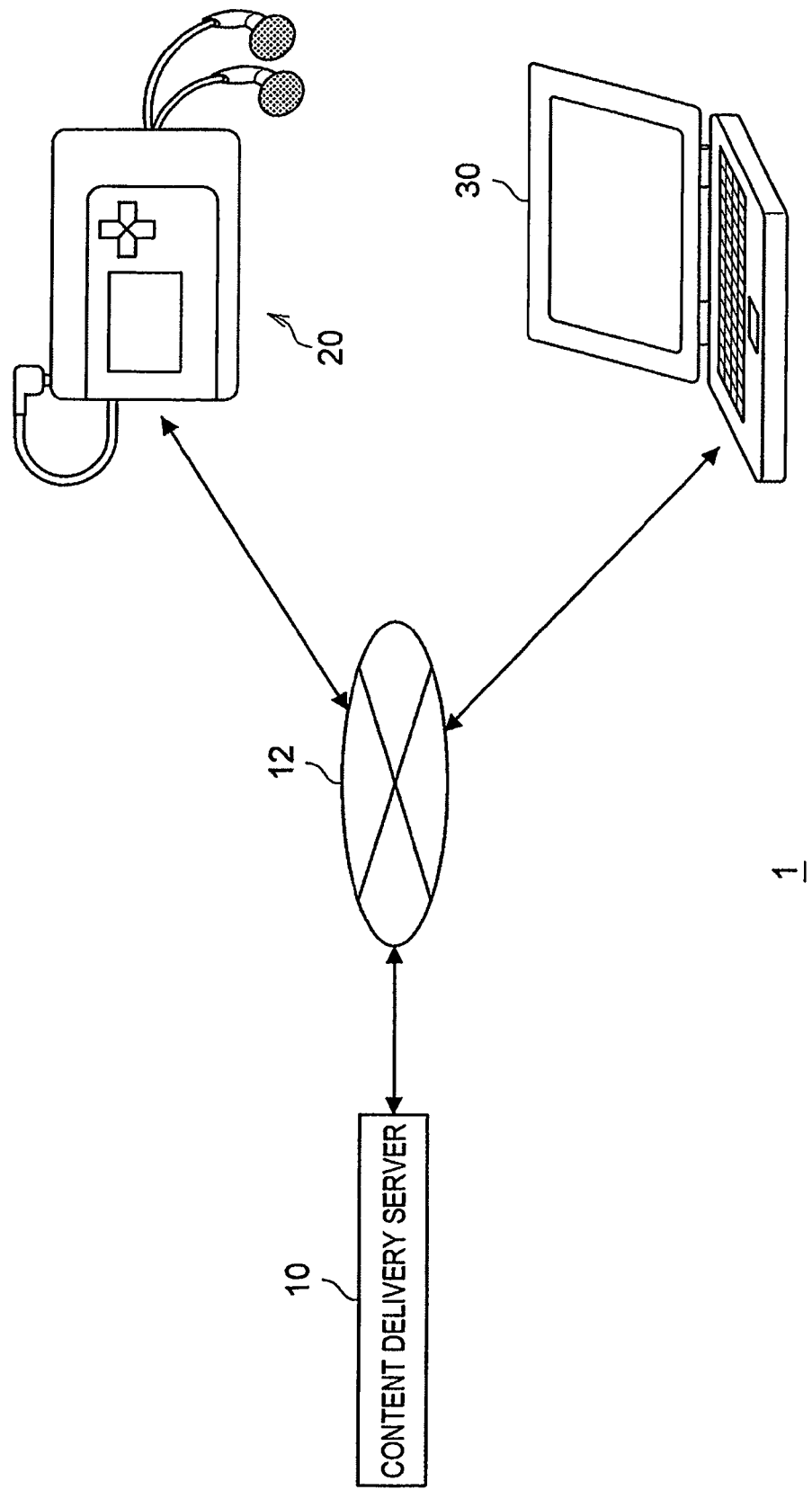
FIG. 1 is an explanatory view showing a configuration of a content communication system 1 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Moreover, in the present description, a content communication system 1 including a portable equipment 20 according to the present embodiment will be explained referring to FIG. 1 and FIG. 2, a configuration of the portable equipment 20 according to the present embodiment will be explained referring to FIG. 3 and FIG. 4, the contents of data stored in the portable equipment 20 will be explained referring to FIG. 5 through FIG. 12, and an operation example of the portable equipment 20 will be explained referring to FIG. 13 through FIG. 20.

FIG. 1 is an explanatory view showing a configuration of a content communication system 1 according to the present embodiment. The content communication system 1 includes: a content delivery server 10; a communication network 12; a portable equipment 20; and a PC 30, and content data stored in the portable equipment 20, including a jacket photograph, may be displayed on a search screen in the portable equipment 20.

The content delivery server 10 delivers, transmits, or broadcasts the content data to the portable equipment 20 and the PC 30 through the communication network 12. The content delivery server 10 may perform, for example, one segment broadcasting transmitting a content data in a digital form, using radio waves as the communication network 12, and digital radio broadcasting. Here, it is acceptable to use cables such as copper wires or optical fibers, a data transmission line such as radio waves, data relay such as a router and a base station controlling communications, or the like as the communication network 12.

Moreover, the content data is a concept including music data such as pieces of music, lectures, and radio programs, image data and/or voice data such as movies, television programs, video programs, photographs, documents, paintings, and diagrams, and arbitrary data such as games and piece of software.

Here, the PC 30 may record content data, which is broadcast from the content delivery server 10 through the communication network 12, in a built-in storage medium. Moreover, the PC 30 may record content data in the built-in storage medium, wherein the content data has been stored in an optical disc such as a CD-R (Compact Disc Recordable)/RW (ReWritable), a DVD-R (Digital Versatile Disc Recordable)/RW/+R/+RW/RAM (Random Access Memory), and a BD (Blu-Ray Disc (registered trademark))-R/BD-RE.

Moreover, the PC 30 may transmit content data recorded in the built-in storage medium to the portable equipment 20, and may manage content data stored by the portable equipment 20, a data structure of a database for searching the content data, and the like. Here, the PC 30 may transmit the content data to the portable equipment 20 by a down-loading method, or by a streaming method. The streaming method is a method by which content data is chronologically transmitted simultaneously with the reproduction speed of the content data in the portable equipment 20. On the other hand, the downloading method is a transmission method in which content data may be reproduced in the portable equipment 20 after the whole content data is transmitted to the portable equipment 20.

The portable equipment 20 may record content data transmitted from the content delivery server 10, and content data transmitted from the PC 30 in the storage medium. Moreover, the portable equipment 20 stores a search database in which pieces of metadata (content addition information) corresponding to one or two or more pieces of content data are hierarchized in order to search content data recorded in the storage medium. Moreover, the portable equipment 20 also has a function by which a search screen for content data is displayed based on the search database, and the content data searched by a user is reproduced through the search screen. One example of an appearance configuration of such portable equipment 20 will be explained referring to FIG. 2.

Figure 2A:
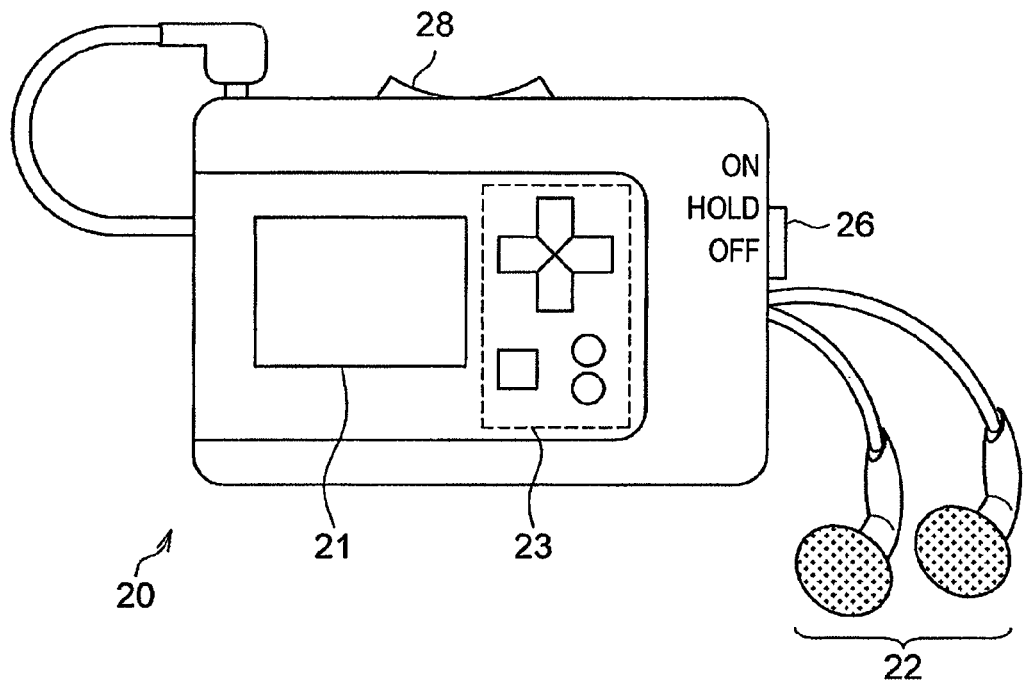
FIG. 2 is an explanatory view showing an example of an appearance configuration of a portable equipment according to the first embodiment of the present invention.
Figure 2B:
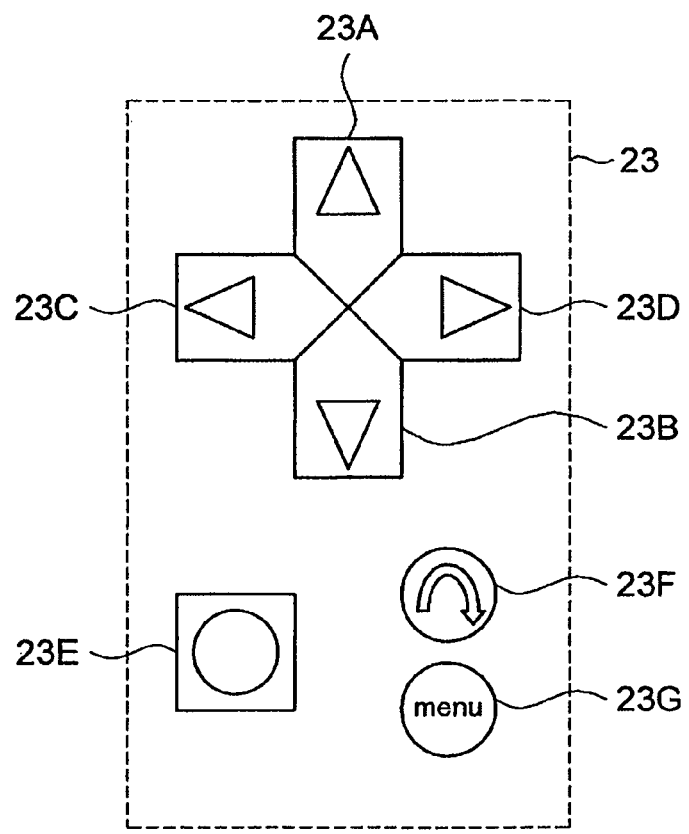

FIG. 2 is an explanatory view showing an example of an appearance configuration of the portable equipment 20 according to the present embodiment. More particularly, FIG. 2A is a front view of the portable equipment 20 according to the present embodiment, and FIG. 2B is an explanatory view showing an enlarged instruction operation portion 23 in the portable equipment 20 according to the present embodiment. In the example shown in FIG. 2A, the portable equipment 20 is provided with: a display portion 21; a voice output portion 22; the instruction operation portion 23; a hold operation portion 26 and a volume operation portion 28.

The display portion 21 has a function to display an image, and, may be, for example, a liquid crystal display (LCD), an organic EL (Electro Luminescence) display, or a plasma display. Images based on image data included in content data, images showing reproduction situations of the content data, and the like are displayed on the display portion 21.

The voice output portion 22 has a function to output voice based on voice data included in content data. Here, an earphone is only one example of the voice output portion 22, and, acceptably, the voice output portion 22 is a speaker or a headphone in FIG. 2A.

The instruction operation portion 23 instructs the portable equipment 20 to execute predetermined processing and detects an instruction operation by which data is input to the portable equipment 20. The predetermined processing includes, for example, reproduction of content data, a temporary stop thereof, forwarding thereof, and rewinding thereof. Moreover, the instruction operation portion 23 includes: a cross key such as an upper button 23A; a lower button 23B; a left button 23C and a right button 23D; a decision button 23E; a return button 23F; and a menu button 23G as shown in FIG. 2B.

The buttons 23A through 23D forming the cross key are used when the cursor is put on a selection item displayed on the display portion 21. There may be applied, for example, a configuration in which the cursor is moved upward when the upper button 23A is pushed, the cursor is moved downward when the lower button 23B is pushed, the cursor is moved left when the left button 23C is pushed, and the cursor is moved right when the right button 23D is pushed. Here, the selection items include: a content name; an album name; the kind of metadata in content data to be edited; and the like.

Moreover, the decision button 23E is used when a selection item on which the cursor is put is executed. Moreover, the return button 23F is used when the display screen displayed on the display portion 21 is returned to the previous state. Moreover, the menu button 23G is used when a menu screen is displayed, wherein any one of settings such as a setting of metadata of content data and a setting of a form of a screen displayed on the display portion 21 is selected on the menu screen.

Here, the cross key, the decision button 23E, and the like are shown only as one example of a concrete configuration for the instruction operation portion 23, and the instruction operation portion 23 may also include, for example, a touch panel, a button, a switch, a lever, a dial, and a light receiving portion for infrared ray signal generated by a remote controller.

The hold operation portion 26 as a setting operation portion detects an operation in which a user switches for determining whether there is accepted an instruction operation by which the instruction operation portion 23 is instructed to execute predetermined processing. When a user performs a hold-on operation (setting operation) by which the hold operation portion 26 is turned ON, there is caused a hold-on state in which an instruction operation by which the instruction operation portion 23 is instructed to execute predetermined processing is not accepted. When a user performs a hold-off operation (release operation) by which the hold operation portion 26 is turned OFF, there is caused a hold-off state in which an instruction operation by which the instruction operation portion 23 is instructed to execute predetermined processing is accepted. For example, when the hold operation portion 26 is turned OFF, the portable equipment 20 reproduces contents based on a reproduction instruction operation by which reproduction of the contents is instructed. When the hold operation portion 26 is turned ON, the portable equipment 20 does not reproduce contents, even when there is detected a reproduction instruction operation by which reproduction of the contents is instructed.

The volume operation portion 28 has a function by which volume adjustment operation by a user is detected to adjust the volume of voice reproduced through the earphone 22. There may be a configuration, for example, in which, when the one side of the volume operation portion 28 is pressed, the volume is reduced, and, when the other side of the volume operation portion 28 is pressed, the volume is increased.

Here, the portable equipment 20 is shown in FIG. 1 and FIG. 2 as one example of the display device. The display device may include an information processing device such as a cellular telephone with a music reproduction function, a personal handyphone system (PHS), a portable music reproduction device, a portable image processing device, a personal digital assistant (PDA), a hand-held game machine, and a home electrical appliances.

As described above, the portable equipment 20 stores a search database of pieces of content data, and displays a search screen of content data based on the search database, wherein pieces of metadata corresponding to one or two or more pieces of content data are hierarchized in the database. Here, in the portable equipment 20 according to the present embodiment, a plurality of jacket photographs related with the metadata may be switched as image information on certain metadata on the search screen of content data one by one. Thereby, a user may more conveniently search content data according to the portable equipment 20 based on the present embodiment. Hereinafter, the configuration and the operation of the portable equipment 20 with the above-described configuration will be described in detail referring to FIG. 3 through FIG. 20.

Figure 3:
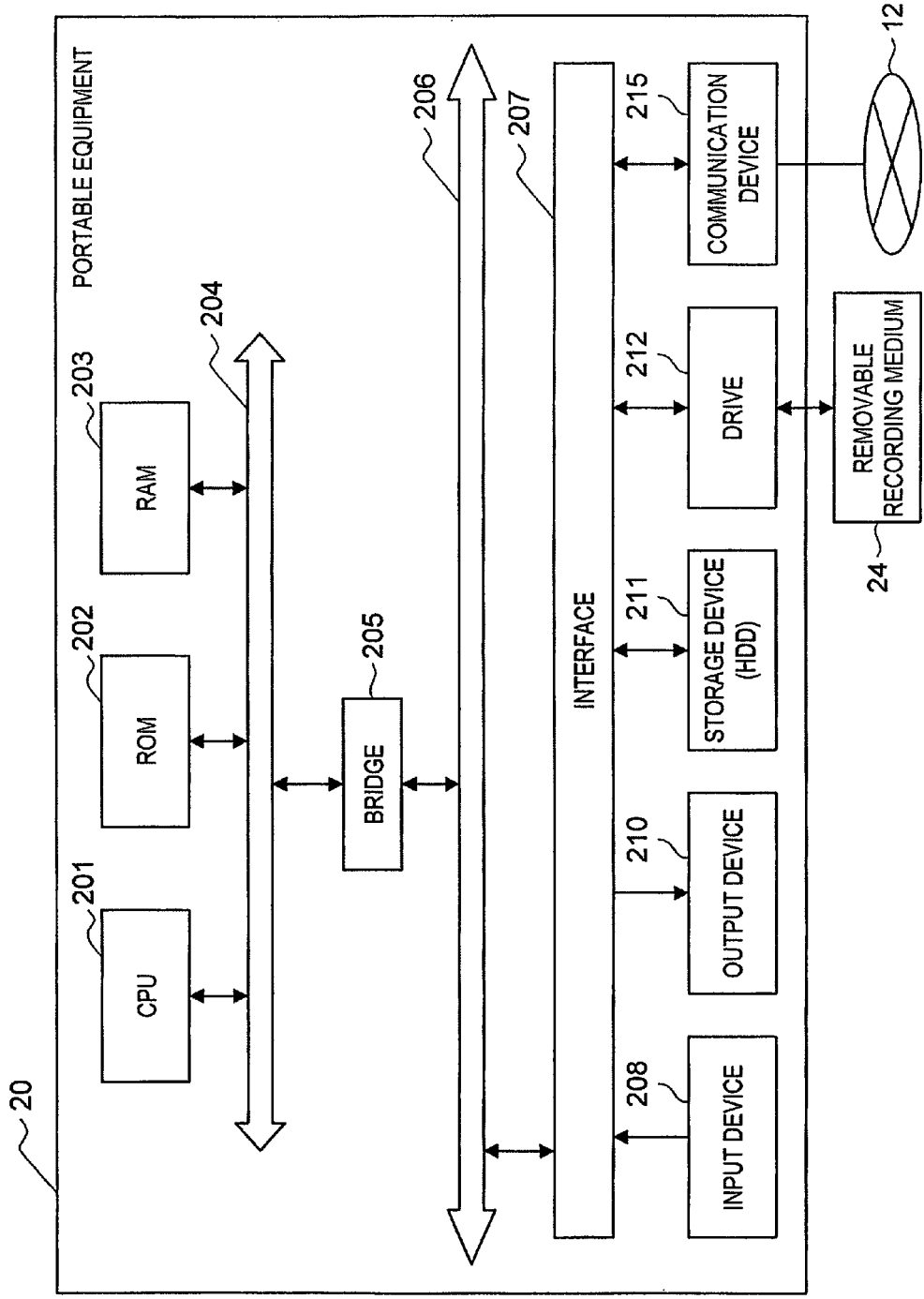
FIG. 3 is an explanatory view showing a hardware configuration of the portable equipment according to the present embodiment.

FIG. 3 is an explanatory view showing a hardware configuration of the portable equipment 20 according to the present embodiment. The portable equipment 20 is provided with: a central processing unit (CPU) 201; a read only memory (ROM) 202; a random access memory (RAM) 203; a host bus 204; a bridge 205; an external bus 206; an interface 207; an input device 208; an output device 210; a storage device (HDD) 211: a drive 212; and a communication device 215.

The CPU 201 functions as an arithmetic processing unit and a controller, and controls the whole operations in the portable equipment 20 according to various kinds of programs. Alternatively, the CPU 201 may be a microprocessor. The ROM 202 stores programs, operation parameters, and the like which the CPU 201 uses. The RAM 203 temporarily stores programs, which are used when the CPU 201 is executed, parameters which are changed appropriately during the execution of the CPU 201, and the like. These are connected to each other through the host bus 204 including a CPU bus and the like.

The host bus 204 is connected to the external bus 206 such as the peripheral component interconnect/interface (PCI) bus through the bridge 205. Here, the host bus 204, the bridge 205, and the external bus 206 are not necessarily separately provided, and it is acceptable to mount the functions of the components 204, 205, and 206 onto one bus.

The input device 208 includes: the instruction operation portion 23, such as a mouse, a keyboard, a touch panel, a button, a microphone, a switch, and a lever, through which a user input information; an input control circuit which generates an input signal based on an input by a user, and outputs the input signal to the CPU 201; and the like. A user of the portable equipment 20 inputs various pieces of data to the portable equipment 20 and instructs the portable equipment 20 to do processing operations by operating the input device 208.

The output device 210 includes, for example: a display device such as a cathode ray tube (CRT), a display device, a liquid crystal display (LCD) device, and a lamp; and a voice output device such as a speaker and a headphone. The output device 210 outputs, for example, reproduced contents. More particularly, a display device corresponding to the display portion 21 displays various pieces of information such as reproduced image data, and the like in text or image format. On the other hand, the voice output device corresponding to the voice output portion 22 converts reproduced voice data and the like into voices for output.

A storage device 211 is a device for saving data, which is configured as one example of a storage portion in the portable equipment 20 according to the present embodiment. The storage device 211 may include a storage medium, a recording device recording data in the storage medium, a reading device reading data from the storage medium, and a deletion device deleting data recorded in the storage medium. The storage device 211 includes, for example, a hard disk drive (HDD). The above storage device 211 drives a hard disk to save programs, which the CPU 201 executes, and various pieces of data. Moreover, content data, a search database for searching content data, and the like are stored in the above storage device 211. Here, it is acceptably that the storage device 211 or the storage medium may be detachably attached from the portable equipment 20.

The drive 212 is a reader writer for the storage medium, and is built in or externally attached to the portable equipment 20. The drive 212 reads information recorded in an installed removable storage medium 24 such as a magnetic disk, an optical disk, a magnet optical disk, or a semiconductor memory, and the read information is output to the RAM 203.

The communication device 215 is, for example, a communication interface which includes communication devices and the like for connection to the communication network 12. Alternatively, the communication device 215 may be a wireless-local-area-network (LAN)-capable communication device, a wireless-USB-capable communication device, a wired communication device for communication by cable, a receiver device for digital radio broadcasting, or a device including an antenna and a television tuner. The above communication device 215 may transmit content data to the content delivery server 10 and the PC 30 through the communication network 12, and may receive the content data therefrom through the network 12.

As described above, the hardware configuration of the portable equipment 20 according to the present embodiment has been explained referring to FIG. 3. Subsequently, functions of the portable equipment 20 will be explained referring to FIG. 4.

Figure 4:
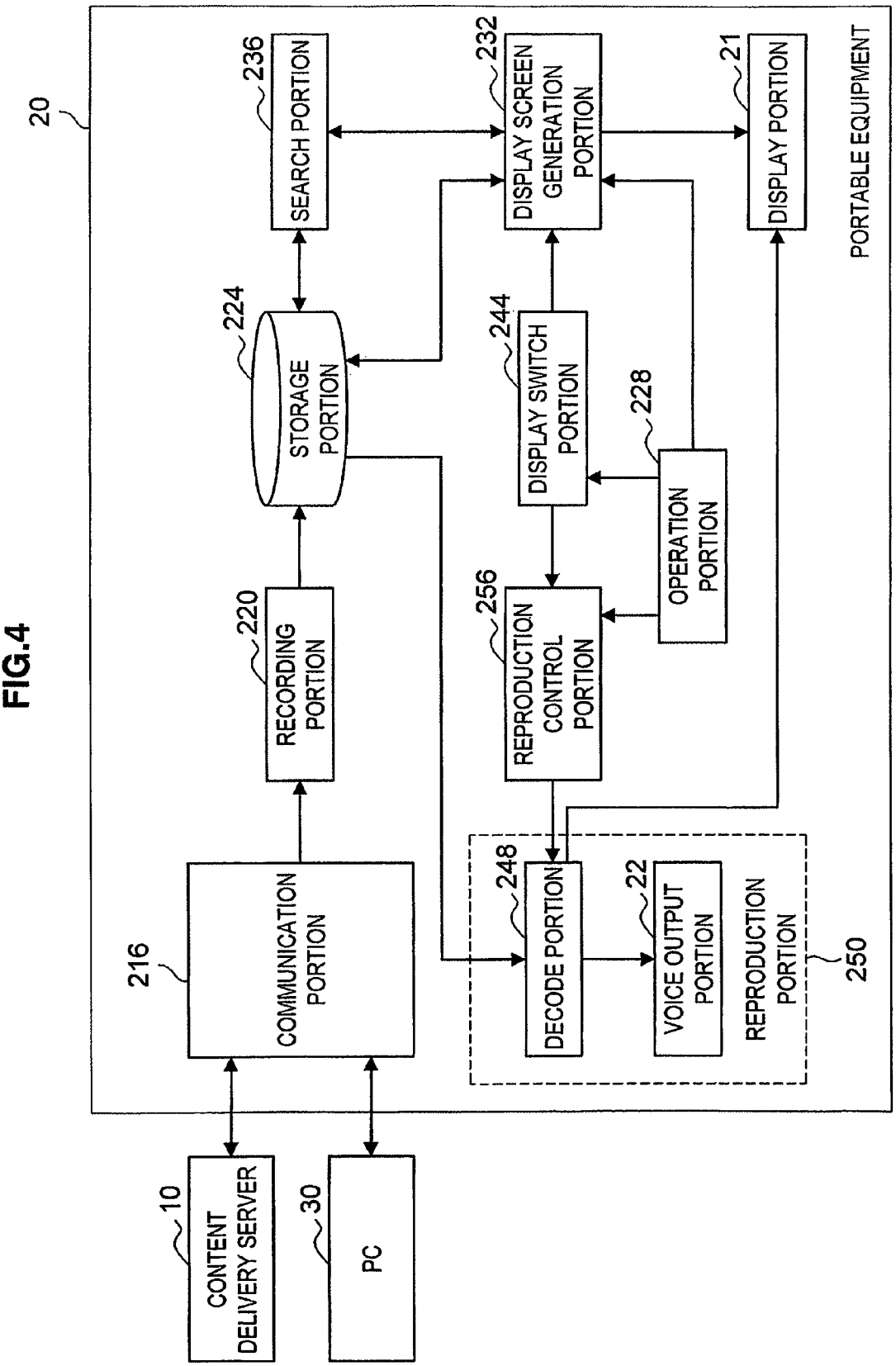
FIG. 4 is a functional block diagram showing a configuration of the portable equipment according to the present embodiment.

FIG. 4 is a functional block diagram showing a configuration of the portable equipment 20 according to the present embodiment. The portable equipment 20 includes: a communication portion 216; a recording portion 220; a storage portion 224; an operation portion 228; a display screen generation portion 232; a search portion 236; the display portion 21; a display switch portion 244; a reproduction portion 250; the voice output portion 22; and a reproduction control portion 256.

The communication portion 216 is an interface with an external device such as the content delivery server 10 and the PC 30, and has functions as a transmission portion and a receiver portion. For example, the communication portion 216 may receive content data for a television program, a movie, and the like, which have been continuously (real time) broadcast, from the content delivery server 10, using radio waves. The content data transmitted from the content delivery server 10 may be in a digital format, or in an analog format.

Here, it is acceptable that the communication portion 216 is software for functioning the communication device 215 shown in FIG. 3, or a communication device 215 which operates based on the above software. Moreover, it is acceptable that the communication portion 216 and the content delivery server 10 communicate with each other through the communication network 12 as shown in FIG. 1, though the communication portion 216 and the content delivery server 10 directly communicate with each other in FIG. 4.

The recording portion 220 records content data received by the communication portion 216 in the storage portion 224. Moreover, the recording portion 220 may acquire content data recorded in the optical disk and the flash memory for recording the content data in the storage portion 224.

The storage portion 224 functions as a storage medium storing content data. Moreover, the storage portion 224 stores metadata representing the attribute of content data, and a search database hierarchized according to the attribute of content data to which the above metadata is corresponding. The content of data stored by such storage portion 224 will be explained referring to FIG. 5 through FIG. 12.

Figure 5:
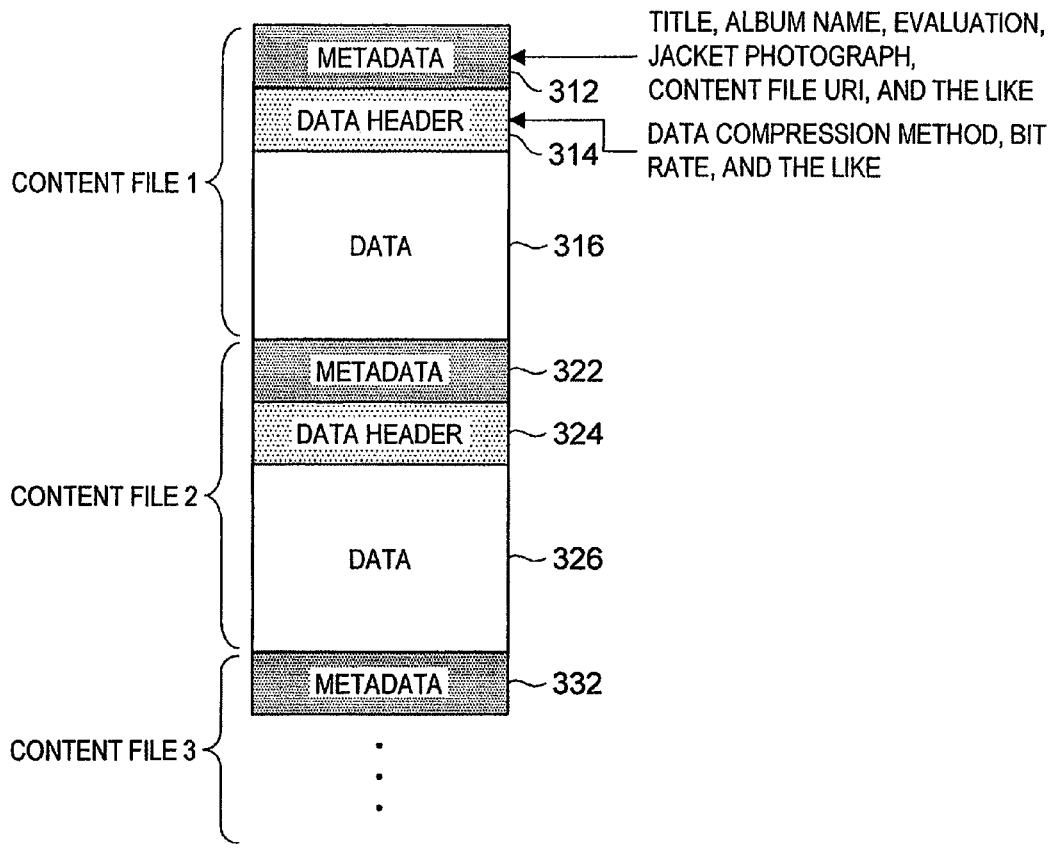
FIG. 5 is an explanatory view showing one example of a content file stored in the storage portion.

FIG. 5 is an explanatory view showing one example of a content file stored in the storage portion 224. In the example shown in FIG. 5, the storage portion 224 stores: metadata 312; a content file 1 including a data header 314 and content data (data) 316; and a content file 2.

The metadata 312 is information showing the attribute of content data 316 included in the same content file 1. The metadata 312 includes, for example: the title of the content data 316; the name of an album recording the content data 316; evaluation to the content data 316; a jacket photograph of image information of the content data 316; and the uniform resource identifier (URI) of the content file, wherein the URI represents the location of the content file 1.

The data header 314 is information related with the data format of the content data 316 included in the same content file 1. The data header 314 includes, for example, the compression method, the bit rate information, and the like of the content data 316. The content data 316 is data itself to be reproduced, wherein the data includes image data and voice data.

The content file 2, as well as the content file 1 may include metadata 322, data header 324, and content data 326.

Figure 6:
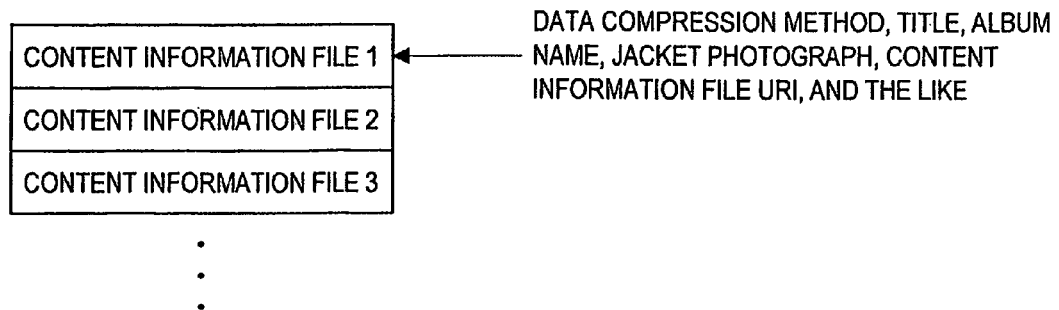
FIG. 6 is an explanatory view showing one example of a content information file stored in the storage portion.

The storage portion 224 stores a content information file shown in FIG. 6 (content fringe file), aside from the above-described content file in some cases.

FIG. 6 is an explanatory view showing one example of a content information file stored in the storage portion 224. In the example shown in FIG. 6, the storage portion 224 stores a content information file 1, a content information file 2, and a content information file 3. The content information file 1 includes, for example: the compression method of the content data 316; the title thereof; the name of an album recording the content data 316; evaluation to the content data 316; a jacket photograph of image information of the content data 316; and the URI of the content file, wherein the URI represents the location of the content file 1.

That is, the content information file 1 includes information described in the metadata 312 and the data header 314 in the content file 1, and does not include the content data 316 in the file 1. The content information file 2 and the content information file 3, as well as the content information file 1, include: the compression method of a content data; the title thereof; the name of an album thereof; the URI of the content file; and the like.

As the above content information file does not include content data, the above file is used in some cases in which the content of metadata, or that of a data header, which are corresponding to content data stored in the storage portion 224, is searched.

Figure 7:
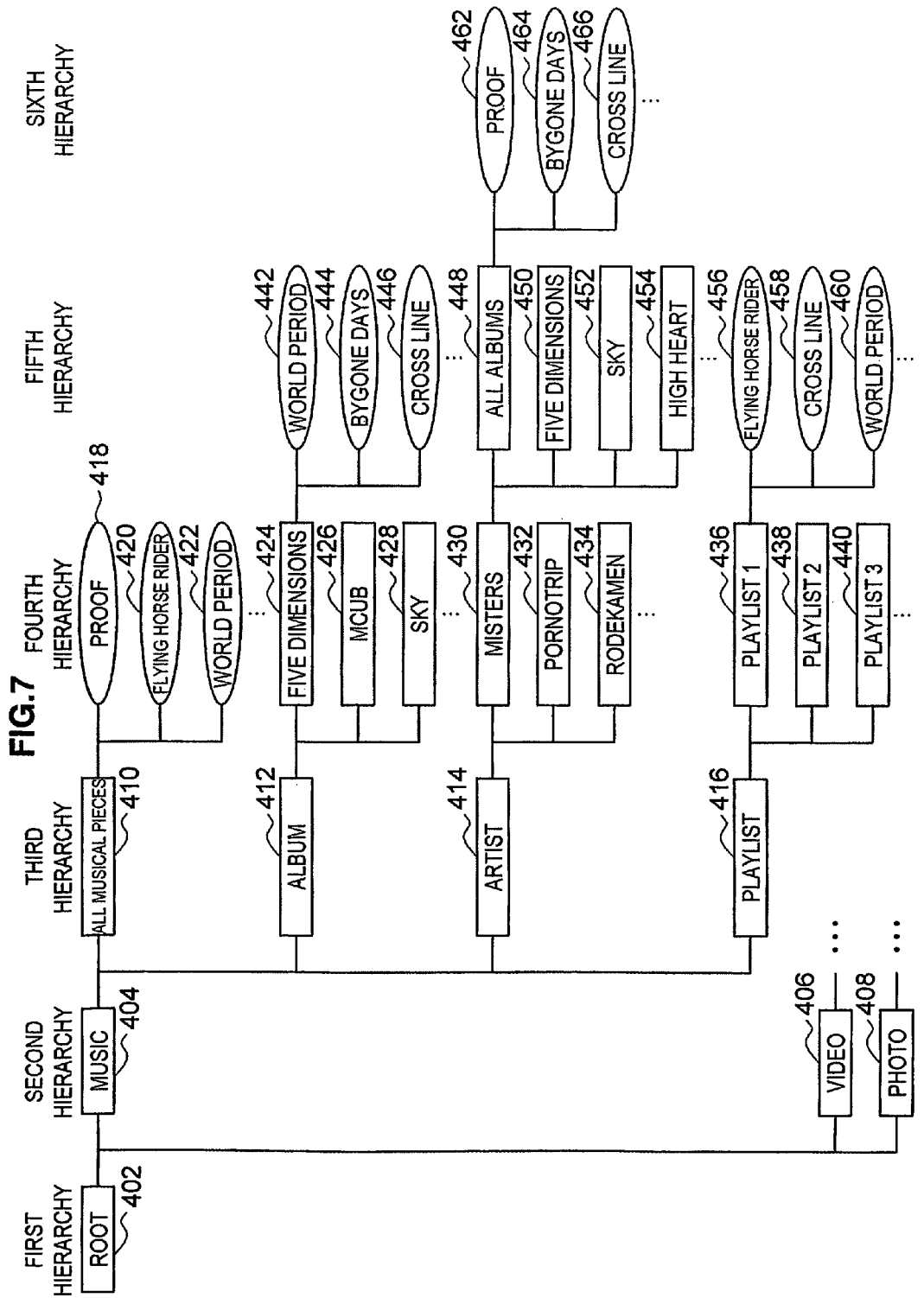
FIG. 7 is an explanatory view showing one example of a database for searching content data stored in the storage portion.

FIG. 7 is an explanatory view showing one example of a database for searching content data stored in the storage portion 224. The search database includes metadata hierarchized according to the attributes of the corresponding one or two or more pieces of content data. That is, metadata in the search database is arranged at any one of nodes in a tree structure according to the attribute of content data corresponding to the metadata.

A "route" 402 is arranged in a first hierarchy of a search database shown in FIG. 7. Moreover, plural pieces of metadata are arranged in a lower second hierarchy of "route" 402.

Specifically, metadata such as "music" 404, "video" 406, and "photo" 408 are arranged in a lower second hierarchy of "route" 402.

Moreover, metadata such as "all musical pieces" 410, "album" 412, "artist" 414, and "playlist" 416 is in a lower third hierarchy of "music" 404. Moreover, all pieces of metadata, such as "proof" 418, "flying horse rider" 420, and "world period" 422, are arranged in a lower hierarchy of "all musical pieces" 410, wherein the metadata is corresponding to content data of music which the storage portion 224 stores.

Moreover, metadata representing the album is arranged in a lower fourth hierarchy of "album" 412 wherein the album records content data of music, such as "five dimensions" 424, "mcub" 426, and "sky" 428, which the storage portion 224 stores. Furthermore, metadata representing content data included in the album "five dimensions" is arranged in a lower fifth hierarchy of "five dimensions" 424 wherein the metadata includes "world period" 442, "bygone days" 444, "cross line" 446, and the like. Here, the metadata having other pieces of metadata in the lower hierarchy corresponds to content data corresponding to the metadata arranged in the lower hierarchy. For example, "five dimensions" 424 corresponds to pieces of content data "world period", "bygone days", and "cross line" because "five dimensions" 424 has pieces of metadata such as "world period" 442, "bygone days" 444, and "cross line" 446 in the lower hierarchy.

Moreover, metadata representing the artist of content data of music which the storage portion 224 stores is arranged in a lower fourth hierarchy of "artist" 414 wherein the metadata includes: "misters" 430, "pornotrip" 432", "rodekamen" 434, and the like. Furthermore, metadata representing an album made by the artist "misters" is arranged in the lower hierarchy of "misters" 430 wherein the metadata includes "all albums" 448, "five dimensions" 450, "sky" 452, "high heart" 454, and the like. Moreover, metadata corresponding to content data included in all albums made by an artist "misters" is arranged in the lower sixth hierarchy of "all albums" 448 wherein the metadata includes "proof" 462, "bygone days" 464, "cross line" 466, and the like.

Moreover, "playlist 1" 436, "playlist 2" 438, and "playlist 3" 440 are arranged in the lower fourth hierarchy of "playlist" 416. Moreover, metadata representing content data registered in "playlist 1", is arranged in the lower hierarchy of "playlist 1" 436 wherein the metadata includes "flying horse rider" 456, "cross line" 458, "world period" 460, and the like.

Metadata of video content data, as well as that of "music" 404, is hierarchically arranged in the lower hierarchy of "video" 406 according to the attribute of the video content data. Moreover, metadata of content data of photograph, as well as that of "music" 404, is hierarchically arranged in the lower hierarchy of "photo" 408 according to the attribute of the video content data.

A user may search desired content data by following the above-described hierarchical structure of the search database. A concrete example of a search screen for a search database by use of which a user searches content data, will be described later referring to FIG. 13 through FIG. 20.

Here, the expression that metadata is arranged acceptably means that metadata has been described at the related node, that the content file URI of the content file shown in FIG. 5 has been described at the related node, or that a content information file URI representing the location of the content information file shown in FIG. 6 has been described at the related node. Subsequently, a concrete example of metadata will be explained referring to FIG. 8 through FIG. 10.

FIG. 8 is an explanatory view showing one example of metadata arranged at a node in the third hierarchy of the search database shown in FIG. 7. In the example shown in FIG. 8, metadata includes object IDs, node names, master IDs, and slave IDs. The object ID is given to each node in the search database, and is information for identifying of each node. In the present description, explanation will be made from a viewpoint of clear explanation, assuming that the sign given to each metadata shown in FIG. 7 is the same as that of the object ID.

Moreover, the master ID included in the metadata represents the object ID of a metadata arranged in the higher hierarchy of the related metadata. Moreover, the slave ID included in the metadata represents the object ID of a metadata arranged in the lower hierarchy of the related metadata.

In the search database shown in FIG. 7, "all musical pieces" 410 in the third hierarchy is associated with a node with an object ID of "410". Moreover, "music" 414 with an object ID of "414" is arranged at an upper node of "all musical pieces" 410, and "proof" 418 with an object ID of "418", "flying horse rider" 420 with an object ID of "420", and "world period" 422 with an object ID of "422" are arranged at a lower node of "all musical pieces" 410. The above metadata "all musical pieces" 410 includes information on an object ID of "410", a node name of "all musical pieces", a master ID of "404", and slave IDs of "418, 420, and 422" as shown in FIG. 8.

Similarly, as shown in FIG. 8, metadata "album" 412 includes information on an object ID of "412", a node name of "album", a master ID of "404", and slave IDs of "424, 426, and 428", metadata "artist" 414 includes information on an object ID of "414", a node name of "artist", a master ID of "404", and slave IDs of "430, 432, and 434", and metadata "playlist" 416 includes information on an object ID "416", a node name of "playlist", a master ID of "404", and a slave ID of "436, 438, and 440".

FIG. 9 is an explanatory view showing one example of metadata of an album arranged at a node in the search database shown in FIG. 7. In the example shown in FIG. 9, the metadata of the album includes: an object ID; an album name (node name); a master ID, a slave ID, and a jacket photograph URI (Uniform Resource Identifier). The jacket photograph URI is information indicating a location at which a jacket photograph of the album is stored.

More particularly, "five dimensions" 424 in the search database shown in FIG. 7 includes: an object ID "424", an album name "five dimensions", a master ID "412", a slave ID "442, 444, and 446", and a jacket photograph URI "aaa" in the example shown in FIG. 9. That is, a jacket photograph of album "five dimensions" is stored at an URI "aaa".

Similarly, in the example shown in FIG. 9, "mcub" 426 includes: an object ID "426"; an album name "mcub"; a master ID "412"; a slave ID "470 and 472"; and a jacket photograph URI "bbb", "sky" 428 includes: an object ID "428"; an album name "sky"; a master ID "412"; slave IDs "474 and 476"; and a jacket photograph URI "ccc", and "high heart" 454 includes: an object ID "454"; an album name "high heart"; a master ID "430"; a slave ID "478 and 480"; and jacket photograph URI "ddd".

Moreover, "all albums" 448 in the search database shown in FIG. 7 indicates that metadata of musical pieces made by "misters", stored by the storage portion 224, and included in all albums is arranged in the lower hierarchy. Accordingly, "all albums" 448 may include a jacket photograph URI showing locations of jacket photographs in all albums made by "misters" and stored in the storage portion 224. Specifically, "all albums" 448 includes in the example shown in FIG. 9: an object ID "448"; an album name "all albums"; a master ID "448"; a slave ID "462, 464, and 466", a jacket photograph URI "aaa" of an album "five dimensions", a jacket photograph URI "ccc" of an album "sky", and a jacket photograph URI "ddd" of an album "high heart".

FIG. 10 is an explanatory view showing one example of metadata of content data arranged at a node in the search database shown in FIG. 7. In the example shown in FIG. 10, metadata of content data includes: an object ID; a name of musical piece (node name); an album name; an artist, and a content file URI. The content file URI is information showing a storage location of a content file, shown in FIG. 5, including jacket photographs.

For example, "world period" 442 in the search database shown in FIG. 7 is arranged at a node with an object ID of "442", the upper node has an object ID "424", content data "world period" is recorded in an album "five dimensions", and content data "world period" is made by "misters". Moreover, it is assumed that a content file including a content data "world period" is stored in a URI "sn1n".

In this case, "world period" 442 in the search database shown in FIG. 7 includes: an object ID "442"; the name of a musical piece "world period"; a master ID "424"; an album name "five dimensions"; an artist "misters"; and a content file URI "sn1n" as shown in FIG. 10.

Similarly, in FIG. 10, "bygone days" 444 in the search database shown in FIG. 7 includes information on: an object ID "444"; a name of a musical piece "bygone days"; a master ID "424"; an album name "five dimensions"; an artist "misters"; and a content file URI "sn2n", "cross line" 446 includes information on: an object ID "446"; a name of a musical piece "cross line"; a master ID "424"; an album name "five dimensions"; an artist "misters"; and a content file URI "sn3n", and "flying horse rider" 456 includes information on: an object ID "456"; a name of a musical piece "flying horse rider"; a master ID "436"; an album name "mcub"; an artist "pornotrip"; and a content file URI "sn4n".

As described above, the content of the metadata arranged at anode in the search database has been explained referring to FIG. 8 through FIG. 10. Subsequently, one example of a jacket photograph corresponding to each piece of metadata has been explained referring to FIG. 11 and FIG. 12.

FIG. 11 is an explanatory view showing examples of jacket photographs for each of albums. A jacket photograph of an album may be an image drawn on a cover of an album, or in an album explanatory note attached to the album. The jacket photographs in such an album are stored at positions indicated by the jacket photograph URIs included in each metadata in the album shown in FIG. 9. For example, the jacket photograph of the album "five dimensions" is a jacket photograph 504 stored in the URI "aaa".

Similarly, a jacket photograph in the album "sky" is a jacket photograph 508 stored in the URI "ccc", a jacket photograph in the album "high heart" is a jacket photograph 512 stored in the URI "ddd", and a jacket photograph in the album "mcub" is a jacket photograph 516 stored in the URI "bbb", as shown in FIG. 11. Here, FIG. 11 shows a case in which each album has one jacket photograph, but each album may have a plurality of jacket photographs such as an image drawn on a cover, and an image drawn on a back cover.

FIG. 12 is an explanatory view showing examples of jacket photographs of pieces of content data. The jacket photographs in pieces of content data may be images drawn on a storage medium recording content data, the cover of the storage medium, or an explanatory note, attached to the storage medium, of content data. A jacket photograph of such content data is stored at a position indicated by a content file URI included in each metadata in content data shown in FIG. 10 as one example. Moreover, when metadata in content data includes a content information file URI representing the location of the content information file shown in FIG. 6, a jacket photograph in the content data may be stored at a position indicated by the content information file URI.

For example, a jacket photograph of content data "world period" is a jacket photograph 520 shown in FIG. 12, a jacket photograph of content data "bygone days" is a jacket photograph 524 shown in FIG. 12, a jacket photograph of content data "cross line" is jacket photographs 528 and 532 shown in FIG. 12, a jacket photograph of content data "proof" is a jacket photograph 536 shown in FIG. 12, and a jacket photograph of content data "flying horse rider" is a jacket photograph 540 shown in FIG. 12. Here, the jacket photographs of the above pieces of content data may be the same as those of albums in which the related pieces of content data are recorded.

As described above, the storage portion 224 stores databases for content data search, content files, content information files, jacket photographs of albums, and the like. The above storage portion 224 may be a nonvolatile memory such as an electrically erasable programmable read-only memory (EEPROM), and an erasable programmable read only memory (EPRPM), a magnetic disk such as a hard disk and a disk type magnetic disk, an optical disc such as a CD-R/RW, a DVD-R/RW/+R/+RW/RAM, and a BD (Blu-Ray Disc (registered trademark))-R/BD-RE, and a storage medium such as a magneto optical (MO) disk.

Returning to explanation of the configuration of the portable equipment 20 referring to FIG. 4, the operation portion 228 corresponds to the instruction operation portion 23, the hold operation portion 26 and the volume operation portion 28, which have been explained by using FIG. 2, and functions as a user interface detecting various kinds of operations performed by a user. The various operations include an operation of putting the cursor on any one of selection items included in the search screen, which is displayed on the display portion 21, for content data, an operation, by which reproduction and feeding of a music piece is instructed, and the like.

The display screen generation portion 232 generates various kinds of screens to be displayed in the display portion 21. The various kinds of screens include, for example: a screen for reproducing content data; a set screen for evaluating content data; a menu screen; a playlist registration screen; and a volume adjustment screen. Moreover, the display screen generation portion 232 generates a search screen through which a user searches content data based on the search database shown in FIG. 7. One example of the above search screen will be explained referring to FIG. 13.

FIG. 13 is an explanatory view showing a search screen generated by the display screen generation portion 232. The search screen includes a plurality of selection items corresponding to metadata such as albums and content data, and, when any one of selection items is selected, the display screen generation portion 232 displays a search screen including the selection items corresponding to metadata in the lower hierarchy of the metadata indicated by the selected selection item.

More specifically, there is generated a search screen which is shown as FIG. 13B, and includes "all musical pieces", "album", "artist", and "playlist" as a selection item based on metadata arranged in the lower hierarchy of "music" 404 shown in FIG. 7, when "music" is selected by operation of a user in a state that there is generated a home menu screen which is shown as FIG. 13A, and includes "music", "video", "photo", and "various settings" as selection items.

Moreover, when "all musical pieces" is selected by operation of a user on the search screen shown as FIG. 13B, the display screen generation portion 232 generates a search screen based on metadata arranged in the lower hierarchy of "all musical pieces" 410 shown in FIG. 7, wherein the search screen is shown as FIG. 13C, and includes "proof", "flying horse rider", "world period" as a selection item. When "proof" is selected by a user on the search screen shown as FIG. 13C, the reproduction portion 250 starts reproduction of content data "proof", and the display screen generation portion 232 generates a reproduction screen of the content data shown as FIG. 13D.

Here, a rectangular area given at the left side of text information on each of selection items shown in FIG. 13 represents a jacket photograph, but a detailed image is eliminated. For example, the jacket photograph 536 of content data "proof" is displayed on the left side of "proof" shown as FIG. 13C.

Moreover, when "album" is selected by operation of a user on the search screen shown as FIG. 13B, the display screen generation portion 232 generates a search screen based on metadata arranged in the lower hierarchy of "album" 412 shown in FIG. 7, wherein the search screen is shown as FIG. 13E, and includes "five dimensions", "mcub", and "sky" as a selection item. Furthermore, the display screen generation portion 232 generates a search screen based on metadata arranged in the lower hierarchy of "five dimensions" 424 shown in FIG. 7, when "five dimensions" is selected on the search screen shown as FIG. 13E, wherein the search screen is shown as FIG. 13F, and includes "world period", "bygone days", and "cross line" as a selection item.

When "bygone days" is selected by a user on the search screen shown as FIG. 13F, the reproduction portion 250 starts reproduction of content data "bygone days", and the display screen generation portion 232 generates a reproduction screen of content data shown as FIG. 13D.

Moreover, when "artist" is selected on the search screen shown as FIG. 13B by operation of a user, the display screen generation portion 232 generates a search screen shown as FIG. 13G based on metadata arranged in the lower hierarchy of "artist" 414 shown in FIG. 7, wherein the search screen includes "misters", "pornotrip", and "rodekamen" as a selection item. Furthermore, when "misters" is selected on the search screen shown as FIG. 13G, the display screen generation portion 232 generates a search screen shown as FIG. 13H based on metadata arranged in the lower hierarchy of "misters" 430 shown in FIG. 7, wherein the search screen includes "all albums", "five dimensions", "sky", and "high heart" as a selection item.

Moreover, when "all albums" is selected on the search screen shown as FIG. 13H, the display screen generation portion 232 generates a search screen shown as FIG. 13I based on metadata arranged in the lower hierarchy of "all albums" 448 shown in FIG. 7, wherein the search screen includes "proof", "bygone days", and "cross line" as a selection item. When "cross line" is selected by a user on the search screen shown as FIG. 13I, the reproduction portion 250 starts reproduction of content data "cross line", and the display screen generation portion 232 generates a reproduction screen of content data shown as FIG. 13D.

Furthermore, when "playlist" is selected on the search screen shown as FIG. 13B by operation of a user, the display screen generation portion 232 generates a search screen shown as FIG. 13J based on metadata arranged in the lower hierarchy of "playlist" 416 shown in FIG. 7, wherein the search screen includes "playlist 1", "playlist 2", and "playlist 3" as a selection item. Furthermore, when "playlist 1" is selected on the search screen shown as FIG. 13J, the display screen generation portion 232 generates a search screen shown as FIG. 13K based on metadata arranged in the lower hierarchy of "playlist 1" 436 shown in FIG. 7, wherein the search screen includes "flying horse rider", "cross line", and "world period" as a selection item.

When "flying horse rider" is selected on the search screen shown as FIG. 13K, the reproduction portion 250 starts reproduction of content data "flying horse rider", and the display screen generation portion 232 generates a reproduction screen of content data shown as FIG. 13D.

As described above, the display screen generation portion 244 generates a search screen of content data including a jacket photograph. More particularly, the display screen generation portion 244 in the portable equipment 20 according to the present embodiment may include jacket photographs related with an album and content data in a selection item representing metadata of the album and the content data and may sequentially switch jacket photographs related with the album and the content data. The above switching of jacket photographs is realized by a concrete configuration of the later-described search portion 236, the display switch portion 244, and the like.

The search portion 236 searches jacket photographs included in the selection item on the search screen. Specifically, the search portion 236 searches jacket photographs related with the metadata indicated by a certain selection item, and supplies the jacket photographs to the display screen generation portion 244. The display screen generation portion 244 generates a search screen on which at least any one of jacket photographs searched by the search portion 236 is included in a selection item.

For example, a jacket photograph related with metadata is a jacket photograph stored at a position indicated by a jacket photograph URI included in the metadata, or a jacket photograph stored at a position indicated by a content file URI included in metadata in the lower hierarchy of the metadata.

For example, the selection item "five dimensions" shown as FIG. 13E indicates metadata "five dimensions" 424 in a search database. Moreover, pieces of metadata "world period" 442, "bygone days" 444, and "cross line" 446 are arranged in the lower hierarchy of a metadata "five dimensions" 424. Accordingly, the search portion 236 searches a jacket photograph 520 in the content data "world period", a jacket photograph 524 in the content data "bygone days", jacket photographs 528, and 532 in content data "cross line", and the like as a jacket photograph including a selection item "five dimensions", other than the jacket photograph 504 in the album "five dimensions".

Then, the display screen generation portion 244 may generate a search screen on which at least any one of jacket photographs 504, 520, 524, 528 and 532 searched by the search portion 236 as described above is included in a selection item "five dimensions".

The display switch portion 244 outputs a switch instruction by which switching of jacket photographs included on a search screen generated by the display screen generation portion 232 is instructed. The display screen generation portion 232 switches jacket photographs to be included in a selection item to another jacket photograph searched by the search portion 236 when a switch instruction is output by the display switch portion 244.

The display switch portion 244 may output the above-described switch instruction at predetermined intervals (set time intervals). According to the above configuration, a user may search content data without special operations referring to jacket photographs which are sequentially switched because jacket photographs included in a selection item on the search screen are automatically switched.

Moreover, the display switch portion 244 may output the above-described switch instruction at intervals corresponding to the number of jacket photographs searched by the search portion 236. For example, the display switch portion 244 may shorten intervals of the switch instruction when there are a lot of jacket photographs searched by the search portion 236, and it is acceptable to lengthen the intervals of the switch instruction when the number of jacket photographs searched by the search portion 236 is small. Alternatively, the display switch portion 244 may output an switch instruction at intervals obtained by division of specific time by a number of jacket photographs related with metadata indicated by a selection item, and all jacket photographs related with metadata indicated by a selection item may be displayed within specific time.

Moreover, the display switch portion 244 may output the above-described switch instruction based on a predetermined operation by a user to the operation portion 228. Alternatively, it is acceptable that the display switch portion 244 outputs a switch instruction at predetermined intervals, while a predetermined operation by a user is not detected, and output of the switch instruction is stopped while a predetermined operation is detected. In the above configuration, the display screen generation portion 232 switches a jacket photograph included on the search screen to another jacket photograph searched by the search portion 236, when a switch instruction based on a predetermined operation by a user is output from the display switch portion 244. Accordingly, a user may maintain display of a certain jacket photograph according to purposes and needs, or may switch display of a certain jacket photograph to that of another jacket photograph related with the same metadata.

The reproduction portion 250 includes: a decode portion 248 and the voice output portion 22, and voices of content data are reproduced based on control of the reproduction control portion 256.

The decode portion 248 decodes voice data input from the communication portion 216 or the storage portion 224. For example, the decode portion 248 may decode voice data with a data format such as MPEG1 Layer-3 (MP3), advanced audio codec (AAC), linear PCM (LPCM), windows media audio 9 (WMA 9), adaptive transform acoustic coding (ATRAC), or ATRAC 3. Moreover, the voice output portion 22 outputs voice data decoded by the decode portion 248. An operation, in which the decode portion 248 decodes voice data and the voice output portion 22 outputs voices as described above, is called reproduction of content data.

The reproduction control portion 256 controls reproduction of content data by the reproduction portion 250. For example, the reproduction control portion 256 reproduces content data in the reproduction portion 250 based on a reproduction instruction of content data input to the operation portion 228, and reproduces the next content data in the reproduction portion 250 based on a sending instruction input to the operation portion 228, wherein content data under reproduction is changed by the sending instruction.

Moreover, the reproduction control portion 256 in the portable equipment 20 according to the present embodiment may reproduce content data in the reproduction portion 250, wherein the content data is corresponding to a jacket photograph included in a selection item, on which the cursor is put on a search screen of content data. For example, when, on a search screen generated by the display screen generation portion 232, the cursor is put on a selection item indicating metadata of a certain album, and the jacket photograph of the content data recorded in the album is included in the selection item, the reproduction control portion 256 may reproduce voices of the content data in the reproduction portion 250.

Moreover, as a jacket photograph included in the search screen is switched according to a switch instruction by the display switch portion 244, the reproduction control portion 256 may switch content data reproduced by the reproduction portion 250 according to a switch instruction by the display switch portion 244.

In the above configuration, the display screen generation portion 232 generates a search screen on which a jacket photograph of content data corresponding to a certain metadata is included in the selection item indicating the above metadata, and, at the same time, the reproduction portion 250 reproduces the above content data. Accordingly, a user may understand the content of the above-described metadata based on a jacket photograph of content data included on the search screen, and on reproduced voice of the content data. Thereby, a user may more conveniently search content data according to the above portable equipment 20. Moreover, it is acceptable that the reproduction portion 250 reproduces content data, or content data for digest reproduction, which is one piece of data in metadata 312. The data for digest reproduction is data obtained by cutting out a predetermined portion of content data only for predetermined time for digest or preview reproduction of content data, wherein the predetermined portion means, for example, an highlight portion (important portion, particular portion).

Moreover, the reproduction control portion 256 according to the present embodiment may reproduce the content data in the reproduction portion 250 at input of the reproduction instruction when a jacket photograph of the content data corresponding to the metadata is included in the selection item indicating a certain metadata. In this configuration, reproduction of content data may be immediately started without following the hierarchical structure of the search database, for example, when there is desired the reproduction of content data corresponding to a jacket photograph included in a selection item indicating metadata of a certain album.

Functions and the configuration of the portable equipment 20 according to the present embodiment have been explained as described above. Subsequently, operations of the portable equipment 20 according to the present embodiment will be explained referring to FIG. 14A through FIG. 20.

FIG. 14A through FIG. 14C are explanatory views showing one example of each search screen represented by the display portion 21 in the portable equipment 20. The display portion 21 displays a search screen including selection items which includes jacket photographs and pieces of text information. In the example shown in FIG. 14A, a search screen displayed by the display portion 21 includes: a selection item "five dimensions" including a jacket photograph 504 and a title of an album "five dimensions"; a selection item "mcub" including a jacket photograph 516 and the title of an album "mcub"; and a selection item "sky" including a jacket photograph 508 and the title of an album "sky". Moreover, a selection item "five dimensions" on which the cursor 40 is put represents "five dimensions" 424 shown in FIG. 7 in an example shown in FIG. 14A.

When a switch instruction is output by the display switch portion 244 on the search screen shown in FIG. 14A, the display screen generation portion 232 switches a jacket photograph 504 included in a selection item "five dimensions" on which the cursor is put to another jacket photograph related with "five dimensions" 424 shown in FIG. 7. Here, jacket photographs related with "five dimensions" 424 include "world period" 442, "bygone days" 444, and "cross line" 446 which are arranged in the lower hierarchy of "five dimensions" 424 shown in FIG. 7. Thereby, the display portion 21 displays a search screen on which, as shown in FIG. 14B, a jacket photograph included in a selection item "five dimensions" is switched to a jacket photograph 520 of content data "world period".

Furthermore, when a switch instruction is output by the display switch portion 244 on the search screen shown in FIG. 14B, the display screen generation portion 232 switches the jacket photograph 520 included in a selection item "five dimensions", on which the cursor is put, to another jacket photograph related with "five dimensions" 424 shown in FIG. 7. Thereby, the display portion 21 displays a switched search screen as shown in FIG. 14C, and, according to the search screen, a jacket photograph included in a selection item "five dimensions" has been changed into a jacket photograph 524 of content data "bygone days".

Hereinafter, when a switch instruction is output by the display switch portion 244, the display screen generation portion 232 may switch a jacket photograph included in a selection item on which the cursor is put, and the display portion 21 may display a search screen on which a jacket photograph of a selection item on which the cursor is put has been switched.

Here, text information is not necessarily included in the selection item. For example, as shown in FIG. 15A through FIG. 15C, the display portion 21 may display only a jacket photograph as a selection item. Moreover, when a reproduction instruction is input in a state that a search screen shown in FIG. 14B is displayed, the reproduction portion 250 starts reproduction of content data "world period", and, when a reproduction instruction is input in a state in which a search screen shown in FIG. 14C is displayed, the reproduction portion 250 may start reproduction of content data "bygone days".

FIG. 16 is a flow chart showing a flow of a display method in the portable equipment 20 in order to display the search screens shown in FIG. 14A through FIG. 14C. First, the search portion 236 in the portable equipment 20 searches (S604) a jacket photograph related with an album indicated by a selection item on which the cursor is put on a search screen. That is, the search portion 236 searches a jacket photograph included in metadata indicated by a selection item on which the cursor is put, or a jacket photograph included in metadata arranged in the lower hierarchy of the metadata.

Subsequently, the display screen generation portion 232 judges (S608) whether a jacket photograph related with an album is searched, wherein the album is indicated by a selection item on which the cursor is put. The display screen generation portion 232 does not show (S612) the jacket photograph related with an album indicated by the selection item on which the cursor is put when a jacket photograph related with an album indicated by a selection item on which the cursor is put is not searched.

On the other side, the display screen generation portion 232 generates a search screen including any one of searched jacket photographs for display (S616) on the display portion 21 when there is searched a jacket photograph related with an album indicated by a selection item on which the cursor is put. Subsequently, an switch instruction is input (S620) to the display screen generation portion 232 by the display switch portion 244 after waiting for the set time. Then, the display screen generation portion 232 judges (S624) whether there is another jacket photograph, other than a jacket photograph included in a search screen under generation, related with an album indicated by a selection item on which the cursor is put.

When it is judged at S624 that there is another jacket photograph related with the metadata of the album, the display screen generation portion 232 generates a search screen including another jacket photograph related with an album indicated by a selection item on which the cursor is put, and the screen is displayed (S628) on the display portion 21. Here, when jacket photographs related with an album indicated by a selection item on which the cursor is put are briefly displayed, jacket photographs are acceptably configured to be displayed again, wherein the jacket photographs are related with an album indicated by a selection item on which the cursor is put. When it is judged at S624 that there is no another jacket photograph related with the album, the portable equipment 20 terminates the above flow.

As jacket photographs in an album, or jacket photographs of content data included in an album are switched for display on a search screen selecting an album according to the above display method as described above, a user may efficiently select an album based on jacket photographs sequentially switched.

FIG. 17A through FIG. 17C are explanatory views showing other examples of search screens displayed by the display portion 21 in the portable equipment 20. The display portion 21 displays a search screen including a selection item containing a jacket photograph and text information. In the example shown in FIG. 17A, the search screen displayed by the display portion 21 includes: a selection item "all albums" including a jacket photograph 504 of an album "five dimensions" and text information of "all albums", a selection item "five dimensions" including a jacket photograph 504 and the title of an album "five dimensions", a selection item "sky" including a jacket photograph 508 and the title of an album "sky", and a selection item "high heart" including a jacket photograph 512 and the title of an album "high heart". In the example shown in FIG. 17A, a selection item "all albums" on which the cursor 40 is put indicates "all albums" 448 shown in FIG. 7.

When a switch instruction is output by the display switch portion 244 on the search screen shown in FIG. 17A, the display screen generation portion 232 switches a jacket photograph 504 included in a selection item "all albums" on which the cursor is put to another jacket photograph related with "all albums" 448 shown in FIG. 7. Here, the jacket photographs related with "all albums" 448 include jacket photographs in "five dimensions" 450, "sky" 452, "high heart" 454, and the like in association with "all albums" 448 shown in FIG. 7. Thereby, the display portion 21 displays a search screen on which, as shown in FIG. 17B, the jacket photograph included in the selection item "all albums" is switched to a jacket photograph 508 in the album "sky".

Furthermore, when a switch instruction is output by the display switch portion 244 on the search screen shown in FIG. 17B, the display screen generation portion 232 switches a jacket photograph 508 included in a selection item "all albums" on which the cursor is put to another jacket photograph related with "all albums" 448 shown in FIG. 7. Thereby, the display portion 21 displays a search screen on which, as shown in FIG. 17C, a jacket photograph 508 included in a selection item "all albums" is switched to a jacket photograph 512 in an album "high heart".

Hereinafter, when a switch instruction is output by the display switch portion 244, the display screen generation portion 232 may switch a jacket photograph included in a selection item on which the cursor is put, and the display portion 21 may display a search screen on which a jacket photograph in a selection item on which the cursor is put is switched.

Here, when a selection item "all albums" is selected by a user in a state in which there is displayed a search screen including a jacket photograph of an album "high heart" as a selection item "all albums" shown in FIG. 17B, the display screen generation portion 232 may generate a search screen including a selection item indicating content data included in an album "high heart" as a selection item.

Figure 18:
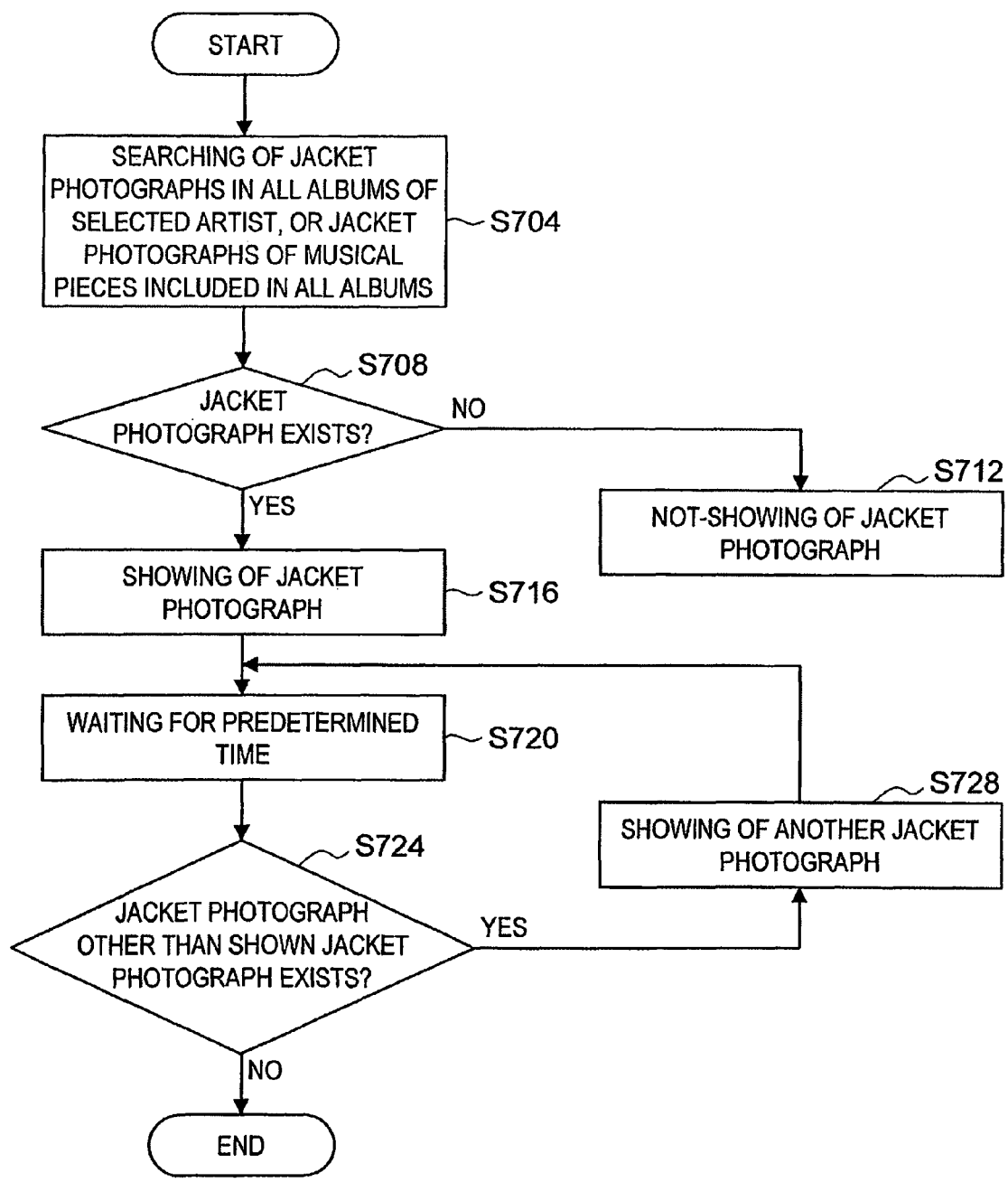
FIG. 18 is a flow chart showing a flow of a display method in a portable equipment in order to display the search screen shown in FIG. 17A through FIG. 17C in the display portion.

FIG. 18 is a flow chart showing a flow of a display method in a portable equipment in order to display the search screen shown in FIG. 17A through FIG. 17C in the display portion 21. First, the search portion 236 in the portable equipment 20 searches (S704) a jacket photograph related with a selection item "all albums" on which the cursor is put on the search screen. That is, the search portion 236 searches a jacket photograph included in metadata "all albums" 448 indicated by a selection item "all albums" on which the cursor is put.

Subsequently, the display screen generation portion 232 judges (S708) whether there is searched a jacket photograph related with a selection item "all albums" on which the cursor is put. When a jacket photograph related with a selection item "all albums" on which the cursor is put is not searched, the display screen generation portion 232 does not display (S712) a jacket photograph related with a selection item "all albums" on which the cursor is put.

On the other hand, when a jacket photograph related with a selection item "all albums", on which the cursor is put, is searched, the display screen generation portion 232 generates a search screen including any one of searched jacket photographs for display (S716) in the display portion 21. Subsequently, a switch instruction is input (S720) to the display screen generation portion 232 by the display switch portion 244 after waiting for the set time. Then, the display screen generation portion 232 judges (S724) whether there is another jacket photograph, other than a jacket photograph included in a search screen under generation, wherein the another jacket photograph is related with a selection item "all albums", on which the cursor is put.

When it is judged at S724 that there is another jacket photograph related with the selection item "all albums", the display screen generation portion 232 generates a search screen including another jacket photograph related with a selection item "all albums" for display (S728) in the display portion 21. On the other hand, when it is judged that another jacket photograph related with a selection item "all albums" does not exist, the portable equipment 20 terminates the above flow.

As described above, according to the above display method, a jacket photograph of an album stored in the storage portion 224 is included in a selection item "all albums", and a jacket photograph of the above album is switched on a search screen selecting an album. Accordingly, a user may understand based on jacket photographs, which are sequentially switched, of an album, what kinds of albums are stored in the storage portion 224.

FIG. 19A through FIG. 19C are explanatory views showing another examples of a search screen displayed by a display portion 21 in a portable equipment 20. The display portion 21 displays a search screen including a selection item which includes a jacket photograph and text information. In the example shown in FIG. 19A, a search screen displayed by the display portion 21 includes: a selection item "playlist 1" including a jacket photograph 540 of content data "flying horse rider", and text information "playlist 1", a selection item "playlist 2" including a jacket photograph 536 of content data "proof", and text information "playlist 2", and a selection item "playlist 3" including a jacket photograph 512 of an album "high heart", and text information "playlist 3". Moreover, in an example shown in FIG. 19A, the selection item "playlist 1" on which the cursor 40 is put indicates "playlist 1" 436 shown in FIG. 7.

When a switch instruction is output by the display switch portion 244 on the search screen shown in FIG. 19A, the display screen generation portion 232 switches the jacket photograph 540 included in a selection item "playlist 1", on which the cursor is put, to another jacket photograph related with "playlist 1" 436 shown in FIG. 7. Here, the jacket photograph related with "playlist 1" 436 includes jacket photographs of "flying horse rider" 456, "cross line" 458, and "world period" 460, which are arranged in the lower hierarchy of "playlist 1" 436. Thereby, the display portion 21 displays a search screen on which, as shown in FIG. 19B, a jacket photograph included in a selection item "playlist 1" is switched to jacket photograph 528 of content data "cross line".

Furthermore, when a switch instruction is output by the display switch portion 244 on the search screen shown in FIG. 19B, the display screen generation portion 232 switches a jacket photograph 528 included in a selection item "playlist 1", on which the cursor is put, to another jacket photograph related with "playlist" 436. Thereby, the display portion 21 displays a search screen on which, as shown in FIG. 19C, the jacket photograph included in a selection item "playlist 1" is switched to a jacket photograph 520 of content data "world period".

Hereinafter, when switch instruction is output by the display switch portion 244, the display screen generation portion 232 switches a jacket photograph included in a selection item on which the cursor is put, and the display portion 21 may display a search screen on which a jacket photograph as a selection item on which the cursor is put is switched.

Here, when there is input a reproduction instruction for a selection item on which the cursor is put, reproduction of content data may be configured to be started by the reproduction portion 250, wherein the content data is corresponding to a jacket photograph included in a selection item on which the cursor is put at input of a reproduction instruction. There may be a configuration in which, when, for example, a reproduction instruction is input while a search screen shown in FIG. 19B is displayed, the reproduction portion 250 starts reproduction of content data "cross line", and when a reproduction instruction is input while a search screen shown in FIG. 19C is displayed, the reproduction portion 250 starts reproduction of content data "world period".

Figure 20:
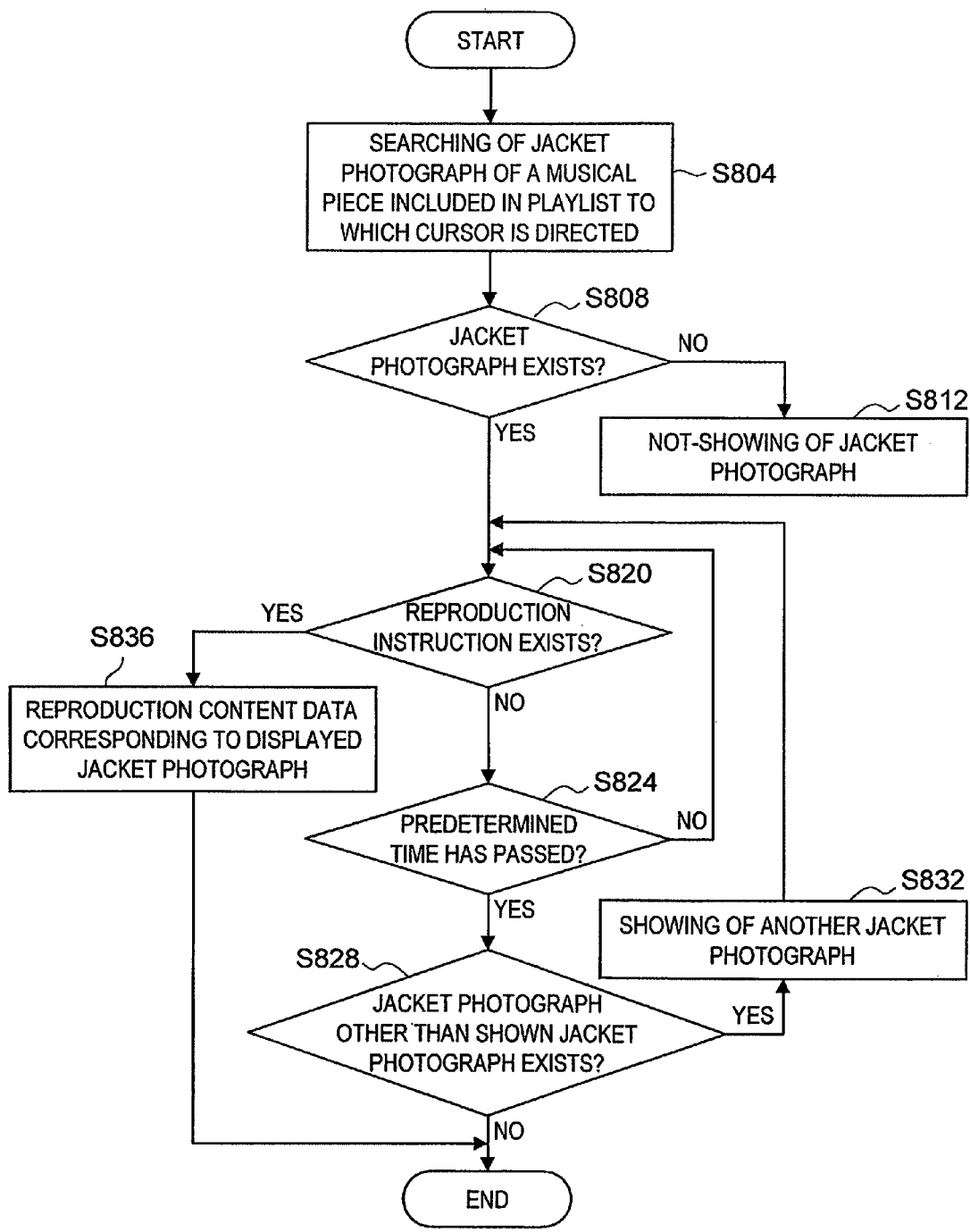
FIG. 20 is a flow chart showing a flow of a display method in a portable equipment in order to display the search screen shown in FIG. 19A through FIG. 19C in the display portion.

FIG. 20 is a flow chart showing a flow of a display method in a portable equipment 20 in order to display the search screen shown in FIG. 19A through FIG. 19C in the display portion 21. First, the search portion 236 in the portable equipment 20 searches (S804), on a search screen, a jacket photograph related with a playlist indicated by a selection item on which the cursor is put. That is, the search portion 236 searches a jacket photograph included in metadata indicated by a selection item on which the cursor is put or, a jacket photograph included in metadata arranged in the lower hierarchy of the above metadata.

Subsequently, the display screen generation portion 232 judges (S808) whether a jacket photograph related with a playlist is searched, wherein the playlist is indicated by a selection item on which the cursor is put. The display screen generation portion 232 does not display (S812) a jacket photograph related with a playlist indicated by a selection item on which the cursor is put, when a jacket photograph related with a playlist is not searched, wherein the playlist is indicated by a selection item on which the cursor is put.

On the other hand, the display screen generation portion 232 generates a search screen including any one of searched jacket photographs for display (S816) on the display portion 21, when a jacket photograph related with a playlist is searched wherein the playlist is indicated by a selection item on which the cursor is put. Subsequently, the reproduction control portion 256 judges (S820) whether a reproduction instruction is input by a user.

When a user judges that a reproduction instruction is not input, the display switch portion 244 judges (S824) whether set time has passed. When it is judged that the set time has not passed, the processing in the portable equipment 20 returns to processing at S820. On the other hand, when it is judged at step S824 that set time has passed, the display screen generation portion 232 receives a switch instruction by the display switch portion 244, and it is judged (S828) whether there is another jacket photograph, other than a jacket photograph included in a search screen under generation, wherein another jacket photograph is related with a playlist indicated by a selection item on which the cursor is put.

When it is judged at S828 that there is another jacket photograph related with a playlist, the display screen generation portion 232 generates a search screen including another jacket photograph related with a playlist indicated by a selection item on which the cursor is put, and the search screen is displayed (S832) on the display portion 21. On the other hand, processing in the portable equipment 20 terminates the above flow when it is judged that another jacket photograph related with an album does not exist.

Moreover, when it is judged at S820 that the reproduction instruction is input, content data corresponding to a jacket photograph included in a selection item, on which the cursor is put at input of the reproduction instruction, is configured to be reproduced (S836) by a reproduction portion 250 under control of the reproduction control portion 256.

As a jacket photograph of content data included in each of playlists is switched for display on a search screen for selecting a playlist according to the above display method as described above, a user may efficiently select a desired playlist based on a jacket photograph which is sequentially switched.

As explained above, the portable equipment 20 according to the present embodiment may sequentially switch a jacket photograph included in a selection item on a search screen of content data to another jacket photograph related with the above selection item. Accordingly, a user of the portable equipment 20 may remember the content of a selection item based on jacket photographs sequentially switched. Thereby, a user may more conveniently search content data according to the above portable equipment 20.

Moreover, the display screen generation portion 232 in the portable equipment 20 according to the present embodiment generates a search screen including a jacket photograph of content data corresponding to the above metadata in a selection item indicating a certain metadata, and, at the same time, the reproduction portion 250 reproduces the above content data. Accordingly, a user may understand the content of the above-described metadata based on a jacket photograph of content data included on the search screen, and voices of the reproduced content data. Thereby, a user may further conveniently search content data according to the above portable equipment 20.

It should be understood by those skilled in the art that various modifications, combinations, sub-combinations and alterations may occur depending on design requirements and other factors insofar as they are within the scope of the appended claims or the equivalents thereof.

Though for example, in the above-described embodiment, a configuration in which only jacket photographs included in a selection item on which the cursor is put are switched for display, the present invention is not limited to the above example. For example, in the portable equipment 20, jacket photographs included in all selection items on the search screen are acceptably switched for display.

Moreover, in the above-described embodiments, emphasis has been put on a case in which content data is voice data, the present invention is not limited to the above example. For example, content data may be data in movies and television programs, and the data includes image data and voice data. In this case, image information on content data may be thumbnails of one scene and a typical image in movies and television programs.

Moreover, steps in processing of the portable equipment 20 in the present description are not necessarily required to be processed, following the orders described in the flow charts, and processing in a parallel base or in an individual base (for example, parallel processing, or object processing) is acceptably included.

Moreover, there may be made computer programs realizing similar functions to those of the above-described portable equipment 20 including hardware such as CPU 201, ROM 202, and RAM 203. Moreover, storage mediums storing the above computer programs may be provided. Moreover, each of functional blocks in the functional block diagram shown in FIG. 4 may be realized by hardware components, that is, series of processing may be achieved by hardware components.

What is claimed is:

1. A portable device comprising:
   a storage portion configured to store audio content data and a plurality of images linked to the audio content data and serving to identify the audio content data; and
   at least one processor configured to:
   receive from a user an input searching for an audio content data item;
   in response to receiving the input searching for the audio content data item, automatically search among the plurality of images stored in the storage portion of the portable device for one or more images identifying the audio content data item sought by the user; retrieve a first image and a second image both identifying the audio content data item;
   in response to retrieving the first image and the second image, display the first image on a display portion of the portable device and, after a first period of time, display the second image on the display portion; and
   if no image in addition to the first image and the second image is retrieved identifying the audio content data item, stop display after the first image and second image are displayed.

2. The portable device according to claim 1, wherein the at least one processor is further configured to retrieve a third image identifying the audio content data item and to display the third image on the display portion after a second period of time subsequent to display of the second image.

3. The portable device according to claim 1, wherein the one or more images comprises multiple images, and wherein the at least one processor is configured to switch, at predetermined time intervals, which image of the multiple images is being shown on the display portion.

4. The portable device according to claim 1, wherein the one or more images comprises multiple images, and wherein the at least one processor is configured to switch which image of the multiple images is being shown on the display portion based at least in part on a number of images in the multiple images.

5. The portable device according to claim 1, wherein the one or more images comprises multiple images, and wherein the at least one processor is configured to switch which image of the multiple images is being shown on the display portion based at least in part on operation of the user.

6. The device according to claim 1, wherein the at least one processor is further configured to reproduce the audio content data item corresponding to the one or more images.

7. A non-transitory computer-readable storage medium encoded with instructions that, when executed by a processor of a portable device configured to store audio content data and a plurality of images linked to the audio content data and serving to identify the audio content data, cause the processor portable device to:
   receive from a user an input searching for an audio content data item;
   in response to receiving the input searching for the audio content data item, search among the plurality of images stored in the storage portion of the portable device for one or more images identifying the audio content data item sought by the user;
   retrieve a first image and a second image both identifying the audio content data item; and
   in response to retrieving the first image and the second image, display the first image on a display portion of the portable device and, after a first period of time, display the second image on the display portion; and
   if no image in addition to the first image and the second image is retrieved identifying the audio content data item, stop display after the first image and second image are displayed.

8. The non-transitory computer-readable storage medium according to claim 7, wherein:
   the instructions, when executed by the processor, further cause the processor to retrieve a third image identifying the audio content data item and to display the third image on the display portion after a second period of time subsequent to display of the second image.

9. The non-transitory computer-readable storage medium according to claim 7, wherein the instructions, when executed by the processor, further cause the processor to reproduce the audio content data item corresponding to the one or more images.

10. The non-transitory computer-readable storage medium according to claim 9, wherein:
    the one or more images comprises multiple images, and wherein the instructions, when executed by the processor, further cause the processor to switch which image of the multiple images is being shown on the display portion based at least in part on a number of images in the multiple images.

11. A method, performed by a portable device configured to store audio content data and a plurality of images linked to the audio content data and serving to identify the audio content data, the method comprising:
    receiving from a user an input searching for an audio content data item;
    in response to receiving the input searching for the audio content data item, automatically searching among the plurality of images stored on the portable device for one or more images identifying the audio content data item sought by the user;
    retrieving a first image and a second image both identifying the audio content data item;
    in response to retrieving the first image and the second image, displaying the first image on a display portion of the portable device and, after a first period of time, displaying the second image on the display portion; and if no image in addition to the first image and the second image is retrieved identifying the audio content data item, stop display after the first image and second image are displayed.

12. The method of claim 11, further comprising retrieving a third image identifying the audio content data item and displaying the third image on the display portion after a second period of time subsequent to display of the second image.

13. The method of claim 11, wherein the one or more images comprises multiple images, and wherein the method further comprises switching which image of the multiple images is being shown on the display portion based at least in part on a number of images in the multiple images.

14. The portable device of claim 1, wherein the portable device is a portable music reproduction device.

15. The non-transitory computer-readable storage medium of claim 7, wherein the portable device is a portable music reproduction device.

16. The method of claim 11, wherein the portable device is a portable music reproduction device.

\* \* \* \* \*